(12) United States Patent
Lesuffleur et al.

(10) Patent No.: US 12,235,477 B2
(45) Date of Patent: Feb. 25, 2025

(54) DEADFRONT CONFIGURED FOR COLOR MATCHING

(71) Applicant: CORNING INCORPORATED, Corning, NY (US)

(72) Inventors: Antoine Daniel Lesuffleur, Fontainebleau (FR); Xu Ouyang, Painted Post, NY (US); Yawei Sun, Elmira, NY (US)

(73) Assignee: CORNING INCORPORATED, Corning, NY (US)

( * ) Notice: Subject to any disclaimer, the term of this patent is extended or adjusted under 35 U.S.C. 154(b) by 697 days.

(21) Appl. No.: 17/259,745

(22) PCT Filed: Jul. 3, 2019

(86) PCT No.: PCT/US2019/040485
§ 371 (c)(1),
(2) Date: Jan. 12, 2021

(87) PCT Pub. No.: WO2020/014064
PCT Pub. Date: Jan. 16, 2020

(65) Prior Publication Data
US 2021/0181392 A1   Jun. 17, 2021

Related U.S. Application Data

(60) Provisional application No. 62/696,967, filed on Jul. 12, 2018.

(51) Int. Cl.
G02B 5/20      (2006.01)
B60K 35/00    (2006.01)
(Continued)

(52) U.S. Cl.
CPC .............. *G02B 5/205* (2013.01); *B60K 35/00* (2013.01); *G02B 1/115* (2013.01); *B60K 35/22* (2024.01);
(Continued)

(58) Field of Classification Search
CPC .. G02B 5/205; B60K 35/00; B60K 2370/152; B60K 2370/28; B60K 2370/39
(Continued)

(56) References Cited

U.S. PATENT DOCUMENTS 2,068,030 A   1/1937 Lieser
2,608,030 A   8/1952 Jendrisak
(Continued)

FOREIGN PATENT DOCUMENTS

CN   1587132 A   3/2005
CN   1860081 A   11/2006
(Continued)

OTHER PUBLICATIONS

Japanese Patent Application No. 2021-500843, Office Action dated Mar. 22, 2023, 7 pages (English Translation only), Japanese Patent Office.
(Continued)

*Primary Examiner* — Audrey Y Chang
(74) *Attorney, Agent, or Firm* — William M. Johnson; Payal A. Patel

(57) ABSTRACT

Embodiments of a deadfront configured to hide a display when the display is not active are provided. The deadfront includes a substrate having a first major surface and a second major surface. The second major surface is opposite the first major surface. The deadfront also includes a neutral density filter disposed on the second major surface of the transparent substrate and an ink layer disposed on the neutral density filter. The deadfront defines at least one display region in
(Continued)

which the deadfront transmits at least 60% of incident light and at least one non-display region in which the deadfront transmits at most 5% of incident light. A contrast sensitivity between each of the at least one display region and each of the at least one non-display region is at least 15 when the display is not active.

19 Claims, 6 Drawing Sheets

(51) Int. Cl.
 *G02B 1/115* (2015.01)
 *B60K 35/22* (2024.01)
 *B60K 35/40* (2024.01)
(52) U.S. Cl.
 CPC ........ *B60K 35/425* (2024.01); *B60K 2360/25* (2024.01); *B60K 2360/28* (2024.01)
(58) Field of Classification Search
 USPC .......................................................... 359/888
 See application file for complete search history.

(56) References Cited

U.S. PATENT DOCUMENTS

| | | |
|---|---|---|
| 3,197,903 A | 8/1965 | Walley |
| 3,338,696 A | 8/1967 | Dockerty |
| 3,582,456 A | 6/1971 | Stolki |
| 3,682,609 A | 8/1972 | Dockerty |
| 3,753,840 A | 8/1973 | Plumat |
| 3,778,335 A | 12/1973 | Boyd |
| 3,790,430 A | 2/1974 | Mochel |
| 3,799,817 A | 3/1974 | Laethem |
| 4,147,527 A | 4/1979 | Bystrov et al. |
| 4,238,265 A | 12/1980 | Deminet |
| 4,445,953 A | 5/1984 | Hawk |
| 4,455,338 A | 6/1984 | Henne |
| 4,859,636 A | 8/1989 | Aratani et al. |
| 4,899,507 A | 2/1990 | Mairlot |
| 4,969,966 A | 11/1990 | Norman |
| 4,985,099 A | 1/1991 | Mertens et al. |
| 5,108,480 A | 4/1992 | Sugiyama |
| 5,154,117 A | 10/1992 | Didelot et al. |
| 5,173,102 A | 12/1992 | Weber et al. |
| 5,245,468 A | 9/1993 | Demiryont et al. |
| 5,250,146 A | 10/1993 | Horvath |
| 5,264,058 A | 11/1993 | Hoagland et al. |
| 5,300,184 A | 4/1994 | Masunaga |
| 5,711,119 A | 1/1998 | Cornils et al. |
| 5,897,937 A | 4/1999 | Cornils et al. |
| 6,044,662 A | 4/2000 | Morin |
| 6,086,983 A | 7/2000 | Yoshizawa |
| 6,101,748 A | 8/2000 | Cass et al. |
| 6,242,931 B1 | 6/2001 | Hembree et al. |
| 6,265,054 B1 | 7/2001 | Bravet et al. |
| 6,270,605 B1 | 8/2001 | Doerfler |
| 6,274,219 B1 | 8/2001 | Schuster et al. |
| 6,287,674 B1 | 9/2001 | Verlinden et al. |
| 6,302,985 B1 | 10/2001 | Takahashi et al. |
| 6,332,690 B1 | 12/2001 | Murofushi |
| 6,387,515 B1 | 5/2002 | Joret et al. |
| 6,420,800 B1 | 7/2002 | Levesque et al. |
| 6,426,138 B1 | 7/2002 | Narushima et al. |
| 6,582,799 B1 | 6/2003 | Brown et al. |
| 6,620,365 B1 | 9/2003 | Odoi et al. |
| 6,816,225 B2 | 11/2004 | Colgan et al. |
| 6,903,871 B2 | 6/2005 | Page |
| 7,016,129 B2 * | 3/2006 | Namazue ............... G02B 5/205 359/888 |
| 7,297,040 B2 | 11/2007 | Chang et al. |
| 7,375,782 B2 | 5/2008 | Yamazaki et al. |
| 7,478,930 B2 | 1/2009 | Choi |
| 7,489,303 B1 | 2/2009 | Pryor |
| 7,542,302 B1 | 6/2009 | Curnalia et al. |
| 7,750,821 B1 | 7/2010 | Taborisskiy et al. |
| 7,955,470 B2 | 6/2011 | Kapp et al. |
| 8,298,431 B2 | 10/2012 | Chwu et al. |
| 8,344,369 B2 | 1/2013 | Yamazaki et al. |
| 8,521,955 B2 | 8/2013 | Arulambalam et al. |
| 8,549,885 B2 | 10/2013 | Dannoux et al. |
| 8,586,492 B2 | 11/2013 | Barefoot et al. |
| 8,652,978 B2 | 2/2014 | Dejneka et al. |
| 8,692,787 B2 | 4/2014 | Imazeki |
| 8,702,253 B2 | 4/2014 | Lu et al. |
| 8,765,262 B2 | 7/2014 | Gross |
| 8,814,372 B2 | 8/2014 | Vandal et al. |
| 8,833,106 B2 | 9/2014 | Dannoux et al. |
| 8,912,447 B2 | 12/2014 | Leong et al. |
| 8,923,693 B2 | 12/2014 | Yeates |
| 8,962,084 B2 | 2/2015 | Brackley et al. |
| 8,967,834 B2 | 3/2015 | Timmerman et al. |
| 8,969,226 B2 | 3/2015 | Dejneka et al. |
| 8,978,418 B2 | 3/2015 | Balduin et al. |
| 9,007,226 B2 | 4/2015 | Chang |
| 9,061,934 B2 | 6/2015 | Bisson et al. |
| 9,090,501 B2 | 7/2015 | Okahata et al. |
| 9,109,881 B2 | 8/2015 | Roussev et al. |
| 9,140,543 B1 | 9/2015 | Allan et al. |
| 9,156,724 B2 | 10/2015 | Gross |
| 9,223,162 B2 | 12/2015 | Deforest et al. |
| 9,240,437 B2 | 1/2016 | Shieh et al. |
| 9,278,500 B2 | 3/2016 | Filipp |
| 9,278,655 B2 | 3/2016 | Jones et al. |
| 9,290,413 B2 | 3/2016 | Dejneka et al. |
| 9,346,703 B2 | 5/2016 | Bookbinder et al. |
| 9,346,706 B2 | 5/2016 | Bazemore et al. |
| 9,357,638 B2 | 5/2016 | Lee et al. |
| 9,442,028 B2 | 9/2016 | Roussev et al. |
| 9,446,723 B2 | 9/2016 | Stepanski |
| 9,469,561 B2 | 10/2016 | Kladias et al. |
| 9,517,967 B2 | 12/2016 | Dejneka et al. |
| 9,573,843 B2 | 2/2017 | Keegan et al. |
| 9,593,042 B2 | 3/2017 | Hu et al. |
| 9,595,960 B2 | 3/2017 | Wilford |
| 9,606,625 B2 | 3/2017 | Levesque et al. |
| 9,617,180 B2 | 4/2017 | Bookbinder et al. |
| 9,663,396 B2 | 5/2017 | Miyasaka et al. |
| 9,694,570 B2 | 7/2017 | Levasseur et al. |
| 9,700,985 B2 | 7/2017 | Kashima et al. |
| 9,701,564 B2 | 7/2017 | Bookbinder et al. |
| 9,720,450 B2 | 8/2017 | Choi et al. |
| 9,724,727 B2 | 8/2017 | Domey et al. |
| 9,802,485 B2 | 10/2017 | Masuda et al. |
| 9,815,730 B2 | 11/2017 | Marjanovic et al. |
| 9,821,509 B2 | 11/2017 | Kastell |
| 9,895,975 B2 | 2/2018 | Lee et al. |
| 9,902,640 B2 | 2/2018 | Dannoux et al. |
| 9,927,650 B1 | 3/2018 | Almanza-Workman et al. |
| 9,931,817 B2 | 4/2018 | Rickerl |
| 9,933,820 B2 | 4/2018 | Helot et al. |
| 9,947,882 B2 | 4/2018 | Zhang et al. |
| 9,955,602 B2 | 4/2018 | Wildner et al. |
| 9,957,190 B2 | 5/2018 | Finkeldey et al. |
| 9,963,374 B2 | 5/2018 | Jouanno et al. |
| 9,972,645 B2 | 5/2018 | Kim |
| 9,975,801 B2 | 5/2018 | Maschmeyer et al. |
| 9,992,888 B2 | 6/2018 | Moon et al. |
| 10,005,246 B2 | 6/2018 | Stepanski |
| 10,017,033 B2 | 7/2018 | Fisher et al. |
| 10,042,391 B2 | 8/2018 | Yun et al. |
| 10,074,824 B2 | 9/2018 | Han et al. |
| 10,086,762 B2 | 10/2018 | Uhm |
| 10,131,118 B2 | 11/2018 | Kang et al. |
| 10,140,018 B2 | 11/2018 | Kim et al. |
| 10,153,337 B2 | 12/2018 | Lee et al. |
| 10,175,802 B2 | 1/2019 | Boggs et al. |
| 10,211,416 B2 | 2/2019 | Jin et al. |
| 10,222,825 B2 | 3/2019 | Wang et al. |
| 10,273,184 B2 | 4/2019 | Garner et al. |
| 10,303,223 B2 | 5/2019 | Park et al. |
| 10,303,315 B2 | 5/2019 | Jeong et al. |
| 10,326,101 B2 | 6/2019 | Oh et al. |

(56) References Cited

U.S. PATENT DOCUMENTS

| | | |
|---|---|---|
| 10,328,865 B2 | 6/2019 | Jung |
| 10,343,377 B2 | 7/2019 | Levasseur et al. |
| 10,347,700 B2 | 7/2019 | Yang et al. |
| 10,377,656 B2 | 8/2019 | Dannoux et al. |
| 10,421,683 B2 | 9/2019 | Schillinger et al. |
| 10,427,383 B2 | 10/2019 | Levasseur et al. |
| 10,444,427 B2 | 10/2019 | Bookbinder et al. |
| 10,483,210 B2 | 11/2019 | Gross et al. |
| 10,500,958 B2 | 12/2019 | Cho et al. |
| 10,606,395 B2 | 3/2020 | Boggs et al. |
| 10,649,267 B2 | 5/2020 | Tuan et al. |
| 10,788,707 B2 | 9/2020 | Ai et al. |
| 10,976,607 B2 | 4/2021 | Huang et al. |
| 2002/0039229 A1 | 4/2002 | Hirose et al. |
| 2003/0156080 A1 | 8/2003 | Koike et al. |
| 2004/0026021 A1 | 2/2004 | Groh et al. |
| 2004/0069770 A1 | 4/2004 | Cary et al. |
| 2004/0107731 A1 | 6/2004 | Doehring et al. |
| 2004/0258929 A1 | 12/2004 | Glaubitt et al. |
| 2005/0178158 A1 | 8/2005 | Moulding et al. |
| 2006/0227125 A1 | 10/2006 | Wong et al. |
| 2007/0188871 A1 | 8/2007 | Fleury et al. |
| 2007/0195419 A1 | 8/2007 | Tsuda et al. |
| 2007/0210621 A1 | 9/2007 | Barton et al. |
| 2007/0221313 A1 | 9/2007 | Franck et al. |
| 2007/0223121 A1 | 9/2007 | Franck et al. |
| 2007/0291384 A1 | 12/2007 | Wang |
| 2008/0031991 A1 | 2/2008 | Choi et al. |
| 2008/0093753 A1 | 4/2008 | Schuetz |
| 2008/0285134 A1 | 11/2008 | Closset et al. |
| 2008/0303976 A1 | 12/2008 | Nishizawa et al. |
| 2009/0096937 A1 | 4/2009 | Bauer et al. |
| 2009/0101208 A1 | 4/2009 | Vandal et al. |
| 2009/0117332 A1 | 5/2009 | Ellsworth et al. |
| 2009/0179840 A1 | 7/2009 | Tanaka et al. |
| 2009/0185127 A1 | 7/2009 | Tanaka et al. |
| 2009/0201443 A1 | 8/2009 | Sasaki et al. |
| 2009/0311497 A1 | 12/2009 | Aoki |
| 2010/0000259 A1 | 1/2010 | Ukrainczyk et al. |
| 2010/0031590 A1 | 2/2010 | Buchwald et al. |
| 2010/0065342 A1 | 3/2010 | Shaikh |
| 2010/0103138 A1 | 4/2010 | Huang et al. |
| 2010/0182143 A1 | 7/2010 | Lynam |
| 2010/0245253 A1 | 9/2010 | Rhyu et al. |
| 2011/0057465 A1 | 3/2011 | Beau et al. |
| 2011/0148267 A1 | 6/2011 | McDaniel et al. |
| 2012/0050975 A1 | 3/2012 | Garelli et al. |
| 2012/0111056 A1 | 5/2012 | Prest |
| 2012/0128952 A1 | 5/2012 | Miwa et al. |
| 2012/0134025 A1 | 5/2012 | Hart |
| 2012/0144866 A1 | 6/2012 | Liu et al. |
| 2012/0152897 A1 | 6/2012 | Cheng et al. |
| 2012/0196110 A1 | 8/2012 | Murata et al. |
| 2012/0202030 A1 | 8/2012 | Kondo et al. |
| 2012/0218640 A1 | 8/2012 | Gollier et al. |
| 2012/0263945 A1 | 10/2012 | Yoshikawa |
| 2012/0280368 A1 | 11/2012 | Garner et al. |
| 2012/0320509 A1 | 12/2012 | Kim et al. |
| 2013/0020007 A1 | 1/2013 | Niiyama et al. |
| 2013/0033885 A1 | 2/2013 | Oh et al. |
| 2013/0070340 A1 | 3/2013 | Shelestak et al. |
| 2013/0081428 A1 | 4/2013 | Liu et al. |
| 2013/0088441 A1 | 4/2013 | Chung et al. |
| 2013/0120850 A1 | 5/2013 | Lambert et al. |
| 2013/0186141 A1 | 7/2013 | Henry |
| 2013/0209824 A1 | 8/2013 | Sun et al. |
| 2013/0279188 A1 | 10/2013 | Entenmann et al. |
| 2013/0314642 A1 | 11/2013 | Timmerman et al. |
| 2013/0329346 A1 | 12/2013 | Dannoux et al. |
| 2013/0330495 A1 | 12/2013 | Maatta et al. |
| 2014/0014260 A1 | 1/2014 | Chowdhury et al. |
| 2014/0065374 A1 | 3/2014 | Tsuchiya et al. |
| 2014/0141206 A1 | 5/2014 | Gillard et al. |
| 2014/0146538 A1 | 5/2014 | Zenker et al. |
| 2014/0153234 A1 | 6/2014 | Knoche et al. |
| 2014/0153894 A1 | 6/2014 | Jenkins et al. |
| 2014/0168153 A1 | 6/2014 | Deichmann et al. |
| 2014/0168546 A1 | 6/2014 | Magnusson et al. |
| 2014/0234581 A1 | 8/2014 | Immerman et al. |
| 2014/0308464 A1 | 10/2014 | Levasseur et al. |
| 2014/0312518 A1 | 10/2014 | Levasseur et al. |
| 2014/0333848 A1 | 11/2014 | Chen |
| 2014/0340609 A1 | 11/2014 | Taylor et al. |
| 2015/0015807 A1 | 1/2015 | Franke et al. |
| 2015/0072129 A1 | 3/2015 | Okahata et al. |
| 2015/0077429 A1 | 3/2015 | Eguchi et al. |
| 2015/0115229 A1 | 4/2015 | Jung |
| 2015/0166394 A1 | 6/2015 | Marjanovic et al. |
| 2015/0168768 A1 | 6/2015 | Nagatani |
| 2015/0177443 A1 | 6/2015 | Faecke et al. |
| 2015/0210588 A1 | 7/2015 | Chang et al. |
| 2015/0246424 A1 | 9/2015 | Venkatachalam et al. |
| 2015/0246507 A1 | 9/2015 | Brown et al. |
| 2015/0274585 A1 | 10/2015 | Rogers et al. |
| 2015/0322270 A1 | 11/2015 | Amin et al. |
| 2015/0336357 A1 | 11/2015 | Kang et al. |
| 2015/0351272 A1 | 12/2015 | Wildner et al. |
| 2015/0357387 A1 | 12/2015 | Lee et al. |
| 2016/0009066 A1 | 1/2016 | Nieber et al. |
| 2016/0009068 A1 | 1/2016 | Garner |
| 2016/0016849 A1 | 1/2016 | Allan |
| 2016/0039705 A1 | 2/2016 | Kato et al. |
| 2016/0052241 A1 | 2/2016 | Zhang |
| 2016/0066463 A1 | 3/2016 | Yang et al. |
| 2016/0081204 A1 | 3/2016 | Park et al. |
| 2016/0083282 A1 | 3/2016 | Jouanno et al. |
| 2016/0083292 A1 | 3/2016 | Tabe et al. |
| 2016/0091645 A1 | 3/2016 | Birman et al. |
| 2016/0102015 A1 | 4/2016 | Yasuda et al. |
| 2016/0113135 A1 | 4/2016 | Kim et al. |
| 2016/0207290 A1 | 7/2016 | Cleary et al. |
| 2016/0214889 A1 | 7/2016 | Garner et al. |
| 2016/0216434 A1 | 7/2016 | Shih et al. |
| 2016/0250982 A1 | 9/2016 | Fisher et al. |
| 2016/0252656 A1 | 9/2016 | Waldschmidt et al. |
| 2016/0259365 A1 | 9/2016 | Wang et al. |
| 2016/0272529 A1 | 9/2016 | Hong et al. |
| 2016/0297176 A1 | 10/2016 | Rickerl |
| 2016/0306451 A1 | 10/2016 | Isoda et al. |
| 2016/0313494 A1 | 10/2016 | Hamilton et al. |
| 2016/0334094 A1* | 11/2016 | Bach ............... F24C 7/086 |
| 2016/0354996 A1 | 12/2016 | Alder et al. |
| 2016/0355091 A1 | 12/2016 | Lee et al. |
| 2016/0355901 A1 | 12/2016 | Isozaki et al. |
| 2016/0375808 A1 | 12/2016 | Etienne et al. |
| 2017/0008377 A1 | 1/2017 | Fisher et al. |
| 2017/0021661 A1 | 1/2017 | Pelucchi |
| 2017/0057356 A1* | 3/2017 | Krier ............... G02B 5/205 |
| 2017/0066223 A1 | 3/2017 | Notsu et al. |
| 2017/0081238 A1 | 3/2017 | Jones et al. |
| 2017/0088454 A1 | 3/2017 | Fukushima et al. |
| 2017/0094039 A1 | 3/2017 | Lu |
| 2017/0115944 A1 | 4/2017 | Oh et al. |
| 2017/0158551 A1 | 6/2017 | Bookbinder et al. |
| 2017/0160434 A1 | 6/2017 | Hart et al. |
| 2017/0185289 A1 | 6/2017 | Kim et al. |
| 2017/0190152 A1 | 7/2017 | Notsu et al. |
| 2017/0197561 A1 | 7/2017 | McFarland |
| 2017/0213872 A1 | 7/2017 | Jinbo et al. |
| 2017/0217290 A1 | 8/2017 | Yoshizumi et al. |
| 2017/0217815 A1 | 8/2017 | Dannoux et al. |
| 2017/0240772 A1 | 8/2017 | Dohner et al. |
| 2017/0247291 A1 | 8/2017 | Hatano et al. |
| 2017/0262057 A1 | 9/2017 | Knittl et al. |
| 2017/0263690 A1 | 9/2017 | Lee et al. |
| 2017/0274627 A1 | 9/2017 | Chang et al. |
| 2017/0285227 A1 | 10/2017 | Chen et al. |
| 2017/0305786 A1 | 10/2017 | Roussev et al. |
| 2017/0327402 A1 | 11/2017 | Fujii et al. |
| 2017/0334770 A1 | 11/2017 | Luzzato et al. |
| 2017/0349473 A1 | 12/2017 | Moriya et al. |
| 2018/0001768 A1 | 1/2018 | Takita |
| 2018/0009197 A1 | 1/2018 | Gross et al. |
| 2018/0014420 A1 | 1/2018 | Amin et al. |

(56) References Cited

U.S. PATENT DOCUMENTS

| | | | |
|---|---|---|---|
| 2018/0031743 A1 | 2/2018 | Wakatsuki et al. | |
| 2018/0050948 A1 | 2/2018 | Faik et al. | |
| 2018/0069053 A1 | 3/2018 | Bok | |
| 2018/0072022 A1 | 3/2018 | Tsai et al. | |
| 2018/0103132 A1 | 4/2018 | Prushinskiy et al. | |
| 2018/0111569 A1* | 4/2018 | Faik | B60K 35/00 |
| 2018/0122863 A1 | 5/2018 | Bok | |
| 2018/0125228 A1 | 5/2018 | Porter et al. | |
| 2018/0134232 A1 | 5/2018 | Jacques | |
| 2018/0141850 A1 | 5/2018 | Dejneka et al. | |
| 2018/0147985 A1 | 5/2018 | Brown et al. | |
| 2018/0149777 A1 | 5/2018 | Brown | |
| 2018/0149907 A1 | 5/2018 | Gahagan et al. | |
| 2018/0164850 A1 | 6/2018 | Sim et al. | |
| 2018/0186674 A1 | 7/2018 | Kumar et al. | |
| 2018/0188869 A1 | 7/2018 | Boggs et al. | |
| 2018/0208131 A1 | 7/2018 | Mattelet et al. | |
| 2018/0208494 A1 | 7/2018 | Mattelet et al. | |
| 2018/0210118 A1 | 7/2018 | Gollier et al. | |
| 2018/0215125 A1 | 8/2018 | Gahagan | |
| 2018/0245125 A1 | 8/2018 | Tsai et al. | |
| 2018/0304825 A1 | 10/2018 | Mattelet et al. | |
| 2018/0324964 A1 | 11/2018 | Yoo et al. | |
| 2018/0345644 A1 | 12/2018 | Kang et al. | |
| 2018/0364760 A1 | 12/2018 | Ahn et al. | |
| 2018/0374906 A1 | 12/2018 | Everaerts et al. | |
| 2019/0034017 A1 | 1/2019 | Boggs et al. | |
| 2019/0039352 A1 | 2/2019 | Zhao et al. | |
| 2019/0039935 A1 | 2/2019 | Couillard et al. | |
| 2019/0069451 A1 | 2/2019 | Myers et al. | |
| 2019/0077337 A1 | 3/2019 | Gervelmeyer | |
| 2019/0152831 A1 | 5/2019 | An et al. | |
| 2019/0223309 A1 | 7/2019 | Amin et al. | |
| 2019/0295494 A1 | 9/2019 | Wang et al. | |
| 2019/0315648 A1 | 10/2019 | Kumar et al. | |
| 2019/0329531 A1 | 10/2019 | Brennan et al. | |
| 2019/0331959 A1* | 10/2019 | Weindorf | G06F 3/044 |
| 2020/0064535 A1 | 2/2020 | Haan et al. | |
| 2020/0301192 A1 | 9/2020 | Huang et al. | |
| 2021/0055599 A1 | 2/2021 | Chen et al. | |

FOREIGN PATENT DOCUMENTS

| | | |
|---|---|---|
| CN | 101600846 A | 12/2009 |
| CN | 101684032 A | 3/2010 |
| CN | 201989544 U | 9/2011 |
| CN | 102341356 A | 2/2012 |
| CN | 102464456 A | 5/2012 |
| CN | 102566841 A | 7/2012 |
| CN | 103136490 A | 6/2013 |
| CN | 103587161 A | 2/2014 |
| CN | 203825589 U | 9/2014 |
| CN | 204111583 U | 1/2015 |
| CN | 104656999 A | 5/2015 |
| CN | 104679341 A | 6/2015 |
| CN | 204463066 U | 7/2015 |
| CN | 104843976 A | 8/2015 |
| CN | 105118391 A | 12/2015 |
| CN | 105511127 A | 4/2016 |
| CN | 205239166 U | 5/2016 |
| CN | 105705330 A | 6/2016 |
| CN | 105924018 A | 9/2016 |
| CN | 106256794 A | 12/2016 |
| CN | 205905907 U | 1/2017 |
| CN | 106458683 A | 2/2017 |
| CN | 206114596 U | 4/2017 |
| CN | 206114956 U | 4/2017 |
| CN | 107613809 A | 1/2018 |
| CN | 107757516 A | 3/2018 |
| CN | 108519831 A | 9/2018 |
| CN | 108550587 A | 9/2018 |
| CN | 108725350 A | 11/2018 |
| CN | 109135605 A | 1/2019 |
| CN | 109690662 A | 4/2019 |
| CN | 109743421 A | 5/2019 |
| DE | 4415787 A1 | 11/1995 |
| DE | 4415878 A1 | 11/1995 |
| DE | 69703490 T2 | 5/2001 |
| DE | 102004022008 A1 | 12/2004 |
| DE | 102004002208 A1 | 8/2005 |
| DE | 102009021938 A1 | 11/2010 |
| DE | 102010007204 A1 | 8/2011 |
| DE | 102013214108 A1 | 2/2015 |
| DE | 102014116798 A1 | 5/2016 |
| EP | 0076924 A2 | 4/1983 |
| EP | 0316224 A1 | 5/1989 |
| EP | 0347049 A2 | 12/1989 |
| EP | 0418700 A1 | 3/1991 |
| EP | 0423698 A1 | 4/1991 |
| EP | 0525970 A1 | 2/1993 |
| EP | 0664210 A1 | 7/1995 |
| EP | 1013622 A1 | 6/2000 |
| EP | 1031409 A1 | 8/2000 |
| EP | 1046493 A2 | 10/2000 |
| EP | 0910721 B1 | 11/2000 |
| EP | 1647663 A1 | 4/2006 |
| EP | 2236281 A1 | 10/2010 |
| EP | 2385630 A2 | 11/2011 |
| EP | 2521118 A2 | 11/2012 |
| EP | 2852502 A2 | 4/2015 |
| EP | 2933718 A1 | 10/2015 |
| EP | 3093181 A2 | 11/2016 |
| EP | 3100854 A1 | 12/2016 |
| EP | 3118174 A1 | 1/2017 |
| EP | 3118175 A1 | 1/2017 |
| EP | 3144141 A1 | 3/2017 |
| EP | 3156286 A1 | 4/2017 |
| EP | 3189965 A1 | 7/2017 |
| EP | 3288791 A1 | 3/2018 |
| EP | 3426614 A1 | 1/2019 |
| EP | 3532442 A1 | 9/2019 |
| FR | 2750075 A1 | 12/1997 |
| FR | 2918411 A1 | 1/2009 |
| FR | 3012073 A1 | 4/2015 |
| GB | 0805770 A | 12/1958 |
| GB | 0991867 A | 5/1965 |
| GB | 1319846 A | 6/1973 |
| GB | 2011316 A | 7/1979 |
| GB | 2281542 A | 3/1995 |
| JP | 55-154329 | 12/1980 |
| JP | 57-048082 A | 3/1982 |
| JP | 58-073681 A | 5/1983 |
| JP | 58-194751 | 11/1983 |
| JP | 59-076561 A | 5/1984 |
| JP | 63-089317 A | 4/1988 |
| JP | 63-190730 | 8/1988 |
| JP | 03-059337 U | 6/1991 |
| JP | 03-228840 A | 10/1991 |
| JP | 04-119931 | 4/1992 |
| JP | 05-116972 A | 5/1993 |
| JP | 06-340029 A | 12/1994 |
| JP | 10-218630 A | 8/1998 |
| JP | 11-001349 A | 1/1999 |
| JP | 11-006029 A | 1/1999 |
| JP | 11-060293 A | 3/1999 |
| JP | 3059337 B2 | 7/2000 |
| JP | 2000-260330 A | 9/2000 |
| JP | 2002-251144 A | 9/2002 |
| JP | 2002-255574 A | 9/2002 |
| JP | 2003-500260 A | 1/2003 |
| JP | 2003-276571 A | 10/2003 |
| JP | 2003-321257 A | 11/2003 |
| JP | 2004-101712 A | 4/2004 |
| JP | 2004-284839 A | 10/2004 |
| JP | 2006-181936 A | 7/2006 |
| JP | 2007-094165 A | 4/2007 |
| JP | 2007-188035 A | 7/2007 |
| JP | 2007-197288 A | 8/2007 |
| JP | 2010-145731 A | 7/2010 |
| JP | 2012-103047 A | 5/2012 |
| JP | 2012-111661 A | 6/2012 |
| JP | 2012-150418 A | 8/2012 |
| JP | 2013-084269 A | 5/2013 |
| JP | 2014-126564 A | 7/2014 |

(56) References Cited

FOREIGN PATENT DOCUMENTS

| | | |
|---|---|---|
| JP | 2014-137497 A | 7/2014 |
| JP | 2014-519059 A | 8/2014 |
| JP | 2014-199336 A | 10/2014 |
| JP | 2015-502901 A | 1/2015 |
| JP | 2015-060174 A | 3/2015 |
| JP | 2015-092422 A | 5/2015 |
| JP | 5748082 B2 | 7/2015 |
| JP | 5796561 B2 | 10/2015 |
| JP | 2015-223711 A | 12/2015 |
| JP | 2016-500458 A | 1/2016 |
| JP | 2016-031696 A | 3/2016 |
| JP | 2016-517380 A | 6/2016 |
| JP | 2016-124723 A | 7/2016 |
| JP | 2016-130810 A | 7/2016 |
| JP | 2016-132361 A | 7/2016 |
| JP | 2016-144008 A | 8/2016 |
| JP | 5976561 B2 | 8/2016 |
| JP | 2016-164118 A | 9/2016 |
| JP | 2016-173794 A | 9/2016 |
| JP | 2016-530204 A | 9/2016 |
| JP | 2016-194685 A | 11/2016 |
| JP | 2016-203609 A | 12/2016 |
| JP | 2016-207200 A | 12/2016 |
| JP | 6281825 B2 | 2/2018 |
| JP | 6340029 B2 | 6/2018 |
| KR | 2002-0019045 A | 3/2002 |
| KR | 10-0479282 B1 | 8/2005 |
| KR | 10-2008-0023888 A | 3/2008 |
| KR | 10-2013-0005776 A | 1/2013 |
| KR | 10-2014-0111403 A | 9/2014 |
| KR | 10-2015-0026911 A | 3/2015 |
| KR | 10-2015-0033969 A | 4/2015 |
| KR | 10-2015-0051458 A | 5/2015 |
| KR | 10-1550833 B1 | 9/2015 |
| KR | 10-2015-0121101 A | 10/2015 |
| KR | 10-2016-0118746 A | 10/2016 |
| KR | 10-1674060 B1 | 11/2016 |
| KR | 10-2016-0144008 A | 12/2016 |
| KR | 10-2017-0000208 A | 1/2017 |
| KR | 10-2017-0106263 A | 9/2017 |
| KR | 10-2017-0107124 A | 9/2017 |
| KR | 10-2017-0113822 A | 10/2017 |
| KR | 10-2017-0121674 A | 11/2017 |
| KR | 10-2018-0028597 A | 3/2018 |
| KR | 10-2018-0049484 A | 5/2018 |
| KR | 10-2018-0049780 A | 5/2018 |
| KR | 10-2019-0001864 A | 1/2019 |
| KR | 10-2019-0081264 A | 7/2019 |
| TW | 200704268 A | 1/2007 |
| TW | 201438895 A | 10/2014 |
| TW | 201546006 A | 12/2015 |
| TW | 201636309 A | 10/2016 |
| TW | 201637857 A | 11/2016 |
| VN | 58334 | 7/2018 |
| WO | 94/25272 A1 | 11/1994 |
| WO | 97/39074 A1 | 10/1997 |
| WO | 98/01649 A1 | 1/1998 |
| WO | 00/73062 A1 | 12/2000 |
| WO | 2006/095005 A1 | 9/2006 |
| WO | 2007/055189 A1 | 5/2007 |
| WO | 2007/108861 A1 | 9/2007 |
| WO | 2008/042731 A1 | 4/2008 |
| WO | 2008/153484 A1 | 12/2008 |
| WO | 2009/072530 A1 | 6/2009 |
| WO | 2010/092705 A1 | 8/2010 |
| WO | 2011/029852 A1 | 3/2011 |
| WO | 2011/144359 A1 | 11/2011 |
| WO | 2011/155403 A1 | 12/2011 |
| WO | 2012/005307 A1 | 1/2012 |
| WO | 2012/058084 A2 | 5/2012 |
| WO | 2012/166343 A2 | 12/2012 |
| WO | 2013/072611 A1 | 5/2013 |
| WO | 2013/072612 A1 | 5/2013 |
| WO | 2013/174715 A1 | 11/2013 |
| WO | 2013/175106 A2 | 11/2013 |
| WO | 2014/085663 A1 | 6/2014 |
| WO | 2014/107640 A1 | 7/2014 |
| WO | 2014/172237 A2 | 10/2014 |
| WO | 2014/175371 A1 | 10/2014 |
| WO | 2015/031594 A2 | 3/2015 |
| WO | 2015/055583 A1 | 4/2015 |
| WO | 2015/057552 A2 | 4/2015 |
| WO | 2015/084902 A1 | 6/2015 |
| WO | 2015/085283 A1 | 6/2015 |
| WO | 2015/141966 A1 | 9/2015 |
| WO | 2016/007815 A1 | 1/2016 |
| WO | 2016/007843 A1 | 1/2016 |
| WO | 2016/010947 A1 | 1/2016 |
| WO | 2016/010949 A1 | 1/2016 |
| WO | 2016/044360 A1 | 3/2016 |
| WO | 2016/069113 A1 | 5/2016 |
| WO | 2016/070974 A1 | 5/2016 |
| WO | 2016/115311 A1 | 7/2016 |
| WO | 2016/125713 A1 | 8/2016 |
| WO | 2016/136758 A1 | 9/2016 |
| WO | 2016/173699 A1 | 11/2016 |
| WO | 2016/183059 A1 | 11/2016 |
| WO | 2016/195301 A1 | 12/2016 |
| WO | 2016/196531 A1 | 12/2016 |
| WO | 2016/196546 A1 | 12/2016 |
| WO | 2016/202605 A1 | 12/2016 |
| WO | 2017/015392 A1 | 1/2017 |
| WO | 2017/019851 A1 | 2/2017 |
| WO | 2017/023673 A1 | 2/2017 |
| WO | 2017/106081 A1 | 6/2017 |
| WO | 2017/146866 A1 | 8/2017 |
| WO | 2017/155932 A1 | 9/2017 |
| WO | 2017/158031 A1 | 9/2017 |
| WO | 2018/005646 A1 | 1/2018 |
| WO | 2018/009504 A1 | 1/2018 |
| WO | 2018/015392 A1 | 1/2018 |
| WO | 2018/075853 A1 | 4/2018 |
| WO | 2018/081068 A1 | 5/2018 |
| WO | 2018/102332 A1 | 6/2018 |
| WO | 2018/125683 A1 | 7/2018 |
| WO | 2018/160812 A2 | 9/2018 |
| WO | 2018/200454 A1 | 11/2018 |
| WO | 2018/200807 A1 | 11/2018 |
| WO | 2018/213267 A1 | 11/2018 |
| WO | 2019/055469 A1 | 3/2019 |
| WO | 2019/055652 A1 | 3/2019 |
| WO | 2019/074800 A1 | 4/2019 |
| WO | 2019/075065 A1 | 4/2019 |
| WO | 2019/151618 A1 | 8/2019 |

OTHER PUBLICATIONS

International Search Report and Written Opinion of the International Searching Authority; PCT/US19/40485; Mailed Nov. 13, 2019; 8 Pages; European Patent Office.

Chinese Patent Application No. 201980059216.6, Office Action, dated Aug. 3, 2022, 14 pages, (7 pages of English Translation and 7 pages of Original Copy); Chinese Patent Office.

Ashley Klamer, "Dead front overlays", Marking Systems, Inc., Jul. 8, 2013, 2 pages.

ASTM Standard C770-98 (2013), "Standard Test Method for Measurement of Glass Stress-Optical Coefficient".

International Search Report and Written Opinion of the International Searching Authority; PCT/US2018/012215 Dated Aug. 1, 2018; 21 Pgs; European Patent Office.

International Search Report and Written Opinion of the International Searching Authority; PCT/US2018/041062 Dated Nov. 13, 2018; 15 Pgs; European Patent Office.

Invitation To Pay Additional Fees of the International Searching Authority; PCT/US2018/012215; Mailed May 11, 2018; 13 Pages; European Patent Office.

"Stainless Steel—Grade 410 (UNS S41000)", available online at <https://www.azom.com/article.aspx?ArticleID=970>, Oct. 23, 2001, 5 pages.

"Standard Test Method for Measurement of Glass Stress—Optical Coefficient", ASTM International, Designation: C770-16, 2016.

(56) References Cited

OTHER PUBLICATIONS

ASTM C1279-13 "Standard Test Method for Non-Destructive Photoelastic Measurement of Edge and Surface Stresses in Annealed, Heat-Strengthened, and Fully Tempered Flat Glass"; Downloaded Jan. 24, 2018; 11 Pages.
ASTM C1422/C1422M-10 "Standard Specification for Chemically Strengthened Flat Glass"; Downloaded Jan. 24, 2018; 5 pages.
Burchardt et al., (Editorial Team), Elastic Bonding: The basic principles of adhesive technology and a guide to its cost-effective use in industry, 2006, 71 pages.
Byun et al; "A Novel Route for Thinning of LCD Glass Substrates"; SID 06 Digest; pp. 1786-1788, v37, 2006.
Datsiou et al., "Behaviour of cold bent glass plates during the shaping process", Engineered Transparency. International Conference atglasstec, Dusseldorf, Germany, Oct. 21 and 22, 2014, 9 pages.
Engineering ToolBox, "Coefficients of Linear Thermal Expansion", available online at <https://www.engineeringtoolbox.com/linear-expansion-coefficients-d_95.html>, 2003, 9 pages.
Fauercia "Intuitive HMI for a Smart Life on Board" (2018); 8 Pages http://www.faurecia.com/en/innovation/smart-life-board/intuitive-HMI.
Faurecia: Smart Pebbles, Nov. 10, 2016 (Nov. 10, 2016), XP055422209, Retrieved from the Internet: URL:https://web.archive.org/web/20171123002248/http://www.faurecia.com/en/innovation/discover-our-innovations/smart-pebbles [retrieved on Nov. 23, 2017].
Ferwerda et al., "Perception of sparkle in anti-glare display screens", Journal of the SID, vol. 22, Issue 2, 2014, pp. 129-136.
Galuppi et al; "Buckling Phenomena in Double Curved Cold-Bent Glass;" Intl. J. Non-Linear Mechanics 64 (2014) pp. 70-84.
Galuppi et al; "Large Deformations and Snap-Through Instability of Cold-Bent Glass"; Challenging Glass 4 & Cost Action TU0905 Final Conference; (2014) pp. 681-689.
Galuppi L et al: "Optimal cold bending of laminated glass", Jan. 1, 2007 vol. 52, No. 1/2 Jan. 1, 2007 (Jan. 1, 2007), pp. 123-146.
Gollier et al., "Display Sparkle Measurement and Human Response", SID Symposium Digest of Technical Papers, vol. 44, Issue 1, 2013, pp. 295-297.
Indian Patent Application No. 201917031293 Office Action dated May 24, 2021; 6 pages; Indian Patent Office.
Jalopnik, "This Touch Screen Car Interior is a Realistic Vision of the Near Future", jalopnik.com, Nov. 19, 2014, https://jalopnik.com/this-touch-screen-car-interior-is-a-realistic-vision-of-1660846024 (Year: 2014).
Li et al., "Effective Surface Treatment on the Cover Glass for Autointerior Applications", SID Symposium Digest of Technical Papers, vol. 47, 2016, pp. 467-469.
Pambianchi et al; "Corning Incorporated: Designing a New Future With Glass and Optics"; Chapter 1 In "Materials Research for Manufacturing: an Industrial Perspective of Turning Materials Into New Products"; Springer Series Material Science 224, p. 12 (2016).
Pegatron Corp. "Pegaton Navigate the Future"; Ecockpit/Center Cnsole Work Premiere; Automotive World; Downloaded Jul. 12, 2017; 2 Pages.
Photodon, "Screen Protectors For Your Car's Navi System That You're Gonna Love", photodon.com, Nov. 6, 2015, https://www.photodon.com/blog/archives/screen-protectors-for-your-cars-navi-system-that-youre-gonna-love) (Year: 2015).
Product Information Sheet: Corning® Gorilla® Glass 3 with Native Damage Resistance™, Corning Incorporated, 2015, Rev: F_090315, 2 pages.
Scholze, H., "Glass-Water Interactions", Journal of Non-Crystalline Solids vol. 102, Issues 1-3, Jun. 1, 1988, pp. 1-10.
Stattler; "New Wave—Curved Glass Shapes Design"; Glass Magazine; (2013); 2 Pages.
Stiles Custom Metal, Inc., Installation Recommendations, 2010 https://stilesdoors.com/techdata/pdf/Installation%20Recommendations%20HM%20Windows,%20Transoms%20&%>OSidelites%200710.pdf) (Year: 2010).
Tomozawa et al., "Hydrogen-to-Alkali Ratio in Hydrated Alkali Aluminosilicate Glass Surfaces", Journal of Non-Crystalline Solids, vol. 358, Issue 24, Dec. 15, 2012, pp. 3546-3550.
Zhixin Wang, Polydimethylsiloxane mechanical properties measured by macroscopic compression and nanoindentation techniques, Graduate Theses and Dissertations, University of South Florida, 2011, 79 pages.
Author Unknown; "Stress Optics Laboratory Practice Guide" 2012; 11 Pages.
Belis et al; "Cold Bending of Laminated Glass Panels"; Heron vol. 52 (2007) No. 1/2; 24 Pages.
Doyle et al; "Manual on Experimental Stress Analysis"; Fifth Edition, Society for Experimental Mechanics; Unknown Year; 31 Pages.
Elziere; "Laminated Glass: Dynamic Rupture of Adhesion"; Polymers; Universite Pierre et Marie Curie—Paris VI, 2016. English; 181 Pages.
Fildhuth et al; "Considerations Using Curved, Heat or Cold Bent Glass for Assembling Full Glass Shells", Engineered Transparency, International Conference At Glasstec, Dusseldorf, Germany, Oct. 25 and 26, 2012; 11 Pages.
Fildhuth et al; "Interior Stress Monitoring of Laminated Cold Bent Glass With Fibre Bragg Sensors", Challenging Glass 4 & Cost Action TU0905 Final Conference Louter, Bos & Belis (Eds), 2014; 8 Pages.
Fildhuth et al; "Layout Strategies and Optimisation of Joint Patterns in Full Glass Shells", Challenging Glass 3—Conference on Architectural and Structural Applications of Glass, Bos, Louter, Nijsse, Veer (Eds.), Tu Delft, Jun. 2012; 13 Pages.
Fildhuth et al; "Recovery Behaviour of Laminated Cold Bent Glass—Numerical Analysis and Testing"; Challenging Glass 4 & Cost Action TU0905 Final Conference—Louter, Bos & Beus (EDS) (2014); 9 Pages.
Fildhuth; "Design and Monitoring of Cold Bent Lamination—Stabilised Glass"; Itke 39 (2015) 270 Pages.
Galuppi et al; "Cold-Lamination-Bending of Glass: Sinusoidal is Better Than Circular", Composites Part B 79 (2015) 285-300.
Galuppi et al; "Optical Cold Bending of Laminated Glass"; Internaitonal Journal of Solids and Structures, 67-68 (2015) pp. 231-243.
Millard; "Bending Glass in the Parametric Age"; Enclos; (2015); pp. 1-6; http://www.enclos.com/site-info/news/bending-glass-in-the-parametric-age.
Neugebauer et al; "Let Thin Glass in the Faade Move Thin Glass-New Possibilities for Glass in the Faade", Conference Paper Jun. 2018; 12 Pages.
Vakar et al; "Cold Bendable, Laminated Glass—New Possibilities in Design"; Structural Engineering International, Feb. 2004 pp. 95-97.
Weijde; "Graduation Plan"; Jan. 2017; 30 Pages.
Werner; "Display Materials and Processes," Information Display; May 2015; 8 Pages.

* cited by examiner

DEADFRONT CONFIGURED FOR COLOR MATCHING

CROSS-REFERENCE TO RELATED APPLICATIONS

This application is a national stage application under 35 U.S.C. § 371 of International Application No. PCT/US2019/040485, filed on Jul. 3, 2019, which claims the benefit of priority under 35 U.S.C. § 119 of U.S. Provisional Application Ser. No. 62/696,967 filed on Jul. 12, 2018 the content of which is relied upon and incorporated herein by reference in its entirety.

BACKGROUND

The disclosure relates to a deadfront for a display, and more particularly to deadfronts that having matching regions between display and non-display regions.

SUMMARY

In one aspect, embodiments of the disclosure relates to a deadfront configured to hide a display when the display is not active are provided. The deadfront includes a substrate having a first major surface and a second major surface. The second major surface is opposite the first major surface. The deadfront also includes a neutral density filter disposed on the second major surface of the transparent substrate and an ink layer disposed on the neutral density filter. The deadfront defines at least one display region in which the deadfront transmits at least 60% of incident light and at least one non-display region in which the deadfront transmits at most 5% of incident light. A contrast sensitivity between each of the at least one display region and each of the at least one non-display region is at least 15 when the display is not active.

In another aspect, embodiments of the disclosure relates to a device including a deadfront and light source. The deadfront has a first side and a second side. The second side is opposite the first side. The deadfront includes a substrate having a first major surface and a second major surface. The first surface corresponds to the first side of the deadfront, and the second major surface is opposite the first major surface. The deadfront also includes a neutral density filter disposed on the second major surface of the transparent substrate and an ink layer disposed on the neutral density filter. The light source is disposed on the second side of the deadfront. Light having a first intensity is emitted from the light source onto the second side of the deadfront, and light transmitted through a display region of the deadfront has a second intensity. The second intensity is within 30% of the first intensity.

an article. The article includes a deadfront and a display. The deadfront has a first side and a second side in which the second side is opposite the first side. The deadfront includes a substrate having a first major surface and a second major surface. The first surface corresponds to the first side of the deadfront, and the second major surface is opposite the first major surface. The deadfront also includes a neutral density filter disposed on the second major surface of the transparent substrate and an ink layer disposed on the neutral density filter. The ink layer includes an ink having a reflection coefficient of less than 5%. The display is disposed on the second side of the deadfront, and the display has an internal reflectance of less than 5%. The ink layer defines a non-display region through which light from the display is not transmitted and absence of the ink layer defines a display region through which at least some of light from the display is transmitted.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Referring generally to the figures, various embodiments of a deadfront are provided. In general, a deadfront is a structure used in a display that blocks visibility of display components, icons, graphics, etc. when the display is off, but allows display components to be easily viewed when the display is on. As will be discussed in greater detail herein, the deadfront includes a substrate upon which a neutral density filter is applied. The neutral density filter transmits a relatively high amount of light, e.g., at least 60%, at least 70%, or at least 80% of light, in such a way as to not distort any colors of the display and so as not to substantially diminish the brightness of the display. Further, an ink layer having an ink reflection coefficient within a particular range is applied to the neutral density filter so as to help create the deadfront effect.

In particular, the ink layer increases the contrast sensitivity so that a viewer cannot easily distinguish between display regions and non-display regions of the deadfront that might otherwise be noticeable on account of the high transmittance of the neutral density filter. That is, when the display is turned off, the internal reflectivity of the display could render the display regions more visible than the non-display regions to a viewer because of the high transmittance of the neutral density filter. Providing an ink layer in the non-display regions that has a suitable reflection coefficient can substantially increase the contrast sensitivity so that the human eye cannot easily distinguish between the display region and the non-display regions. Moreover, by providing a neutral density filter with a high transmittance, the deadfront does not substantially diminish the brightness of the underlying display unit. Embodiments of the deadfront discussed herein are provided by way of example and not by way of limitation.

Figure 1:
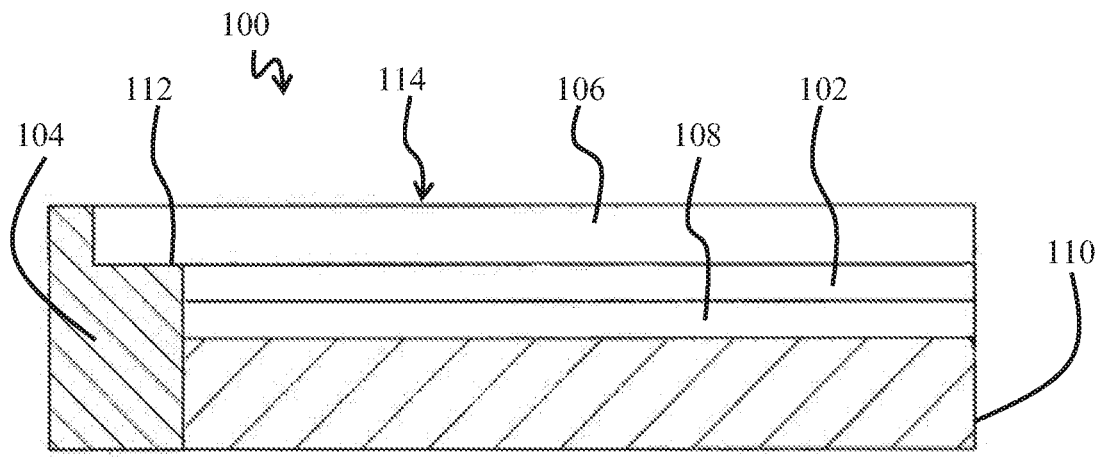
FIG. 1 depicts a partial cross-sectional view of an electronic device, according to an exemplary embodiment.
Figure 10:
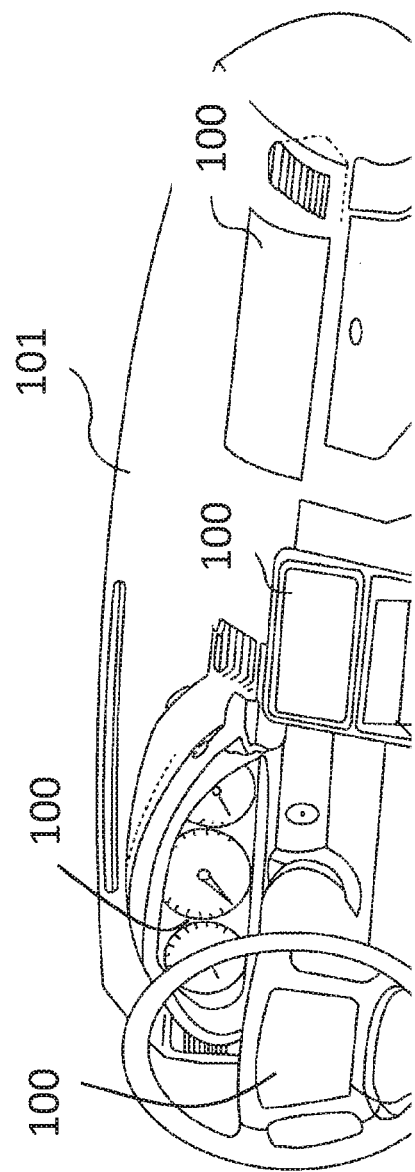
FIG. 10 shows an exemplary vehicle interior including an electronic device according to one or more embodiments of this disclosure.

FIG. 1 is a partial cross-sectional view of an electronic device 100 including a touch interface 102. In embodiments, the electronic device 100 is a standalone device, such as a laptop computer, a tablet computer, a smart-phone, a digital music player, portable gaming station, a television, etc. That is, a standalone electronic device 100 is primarily a display screen or interactive panel not incorporated into another structure, device, or apparatus. In other embodiments, the electronic device 100 is incorporated into another structure, device, or apparatus, such the electronic device 100 is a control panel, e.g., in a vehicle, on an appliance, for an elevator, etc., that allows for interaction with the structure, device, or apparatus. In vehicles as shown in FIG. 10, the electronic device 100 may be incorporated as part of an interior surface 101 thereof. For example, the electronic device 100 may be a display/touch device disposed on a dashboard (i.e., it may form an instrument cluster display, center stack display, and the like), on seat backs, arm rests, pillars, door panels, floor boards, headrests, steering wheel, visors, etc. The vehicle may include passenger vehicles, heavyduty trucks, seacraft, aircraft and the like. In one or more embodiments, the electronic device 100 may be a free-standing display/touch device disposed within the cabin of a vehicle.

In the embodiment depicted in FIG. 1, the electronic device 100 includes the touch interface 102, a housing 104, a deadfront 106, a light source (e.g., display unit 108), and a circuit board 110. The housing 104 at least partially surrounds the touch interface 102, and in the embodiment depicted, provides a seating surface 112 for the deadfront 106. Further, in a standalone device, the housing 104 may provide the boundaries of the electronic device 100, whereas when the electronic device 100 is incorporated into another structure, device, or apparatus, the housing 104 may just provide a mount for the electronic device 100 within the larger overall structure, device, or apparatus. In either configuration, the deadfront 106 covers at least a portion of the touch interface 102 and may be seated into the housing 104 to as to provide a substantially planar viewing surface 114. The circuit board 110 supplies power to the touch interface 102 and to the display unit 108 and processes inputs from the touch interface 102 to produce a corresponding response on the display unit 108.

The touch interface 102 may include one or more touch sensors in order to detect one or more touch or capacitive inputs, such as due to the placement of a user's finger, stylus, or other interaction device close to or on the deadfront 106. The touch interface 102 may generally be any type of interface configured to detect changes in capacitance or other electrical parameters that may be correlated to a user input. The touch interface 102 may be operably connected to and/or in communication the circuit board 110. The touch interface 102 is configured to receive inputs from an object (e.g., location information based on a user's finger or data from the input device). The display unit 108 is configured to display one or more output images, graphics, icons, and/or videos for the electronic device 100. The display unit 108 may be substantially any type of display mechanism, such as an light emitting diode (LED) display, an organic LED (OLED) display, a liquid crystal display (LCD), plasma display, or the like.

In embodiments, the display unit 108 has an internal reflectivity based on the construction of the display unit 108. For example, a direct-lit backlight LCD display unit 108 may contain several layers in front of the light source, such as a polarizers, glass layers, thin film transistor, liquid crystal, color filter, etc. that internally reflect some of the light from the light source. In embodiments, the display unit 108 has an internal reflectivity of no more than 5%. In other embodiments, the display unit 108 has an internal reflectivity of from 0.75% to 4%.

As mentioned above, the deadfront 106 provides a decorative surface that hides any graphics, icons, displays, etc. until a backlight of the display unit 108 is activated. Further, in embodiments, the deadfront 106 provides a protective surface for the touch interface 102. As will be discussed more fully below, the deadfront 106 is constructed so as to allow for a user's interaction to be transmitted through the thickness of the deadfront 106 for detection by the touch interface 102.

Figure 2:
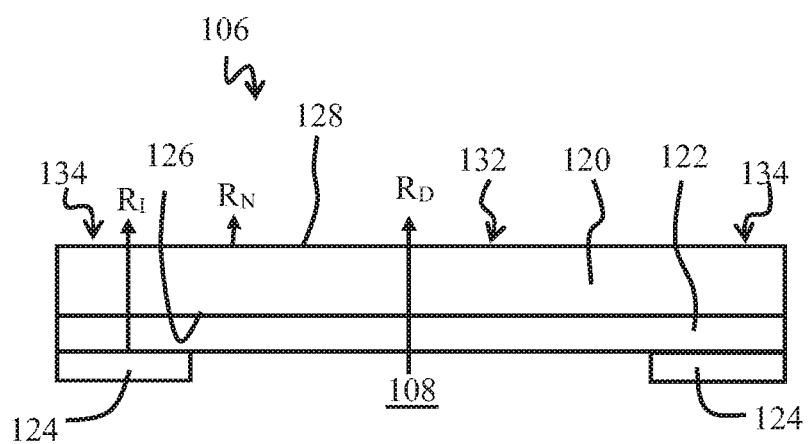
FIG. 2 depicts a cross-sectional view of the layers of a deadfront, according to an exemplary embodiment.

Having described the general structure of the electronic device 100, the structure of the deadfront article 106 is now described. As can be seen in FIG. 2, the deadfront article 106 includes a substrate 120, a neutral density filter 122, and an ink layer 124. In embodiments, the substrate 120 is a glass, glass-ceramic, or a plastic. For example, suitable glass substrates 120 may include at least one of silicates, borosilicates, aluminosilicates, aluminoborosilicates, alkali aluminosilicates, and alkaline earth aluminosilicates, among others. Such glasses may be chemically or thermally strengthened, and embodiments of such glasses are provided below. Exemplary glass-ceramics suitable for use with the deadfront 106 include at least one of the $Li_2O \times Al_2O_3 \times nSiO_2$ system (LAS system), the $MgO \times Al_2O_3 \times nSiO_2$ system (the MAS system), and the $ZnO \times Al_2O_3 \times nSiO_2$ system (the ZAS system), among others. Exemplary plastic substrates suitable for use with the deadfront 106 include at least one of polymethylmethacrylate (PMMA), polyethylene terephthalate (PET), and cellulose triacetate (TAC), polycarbonate (PC) among others. In embodiments, the substrate 120 has a thickness (i.e., distance between a first major surface 126 and a second major surface 128) of no more than about 1 mm, no more than about 0.8 mm, or no more than about 0.55 mm.

In embodiments, the substrate 120 is selected to be transparent. In embodiments, a transparent substrate is one in which at least 70% of light having a wavelength from about 390 nm to about 700 nm that is incident upon the first major surface 126 is transmitted through the second major surface 128. In further embodiments of a transparent substrate, at least 80% of such light is transmitted from the first major surface 126 through the second major surface 128, and in still other embodiments, at least 90% of such light is transmitted from the first major surface 126 through the second major surface 128.

The neutral density filter 122 is disposed on the first surface 126 of the substrate 120. As used herein, a "neutral density filter" is a layer of the deadfront that reduces or modifies the intensity of all wavelengths of light in the visible spectrum substantially equally so as not to change the hue of light transmitted through the deadfront. The neutral density filter 122 is selected to be at least 60% transparent as described above with respect to the substrate 120. In other embodiments, the neutral density filter 122 is selected to be at least 70% transparent. In still other embodiments, the neutral density filter 122 is selected to be at least 80% transparent.

In embodiments, the neutral density filter 122 is a film. For example, in an embodiment, the neutral density filter is a film comprising one or more layers of a polyester, such as polyethylene terephthalate (PET). In certain embodiments, the film includes a tinting component, such as a dye, a pigment, a metallized layer, ceramic particles, carbon particles, and/or nanoparticles (e.g., vanadium dioxide). In embodiments, the tinting component is encapsulated in a laminate adhesive layer between layers of polyester. In embodiments, the film is adhered to the substrate 120 using an adhesive layer, e.g., an acrylic adhesive. In an embodiment, the neutral density filter 122 is a polyester film containing carbon particles, having a thickness of about 50 μm, and a transparency of 70%, such as Prestige 70 (available from 3M, St. Paul, MN).

In other embodiments, the neutral density filter 122 is an ink coating. In embodiments, the neutral density filter 122 is printed onto the substrate 120. In embodiments, the ink coating is printed onto the substrate using screen printing, inject printing, spin coating, and various lithographic techniques, among others. In embodiments, the ink coating comprises dyes and/or pigments. Further, in embodiments, the ink coating is CYMK neutral black having an L* of from 50 to 90 according to the CIE L*a*b* color space.

The neutral density filter 122 is selected so as to be a level of gray or black. In embodiments, with reference to the CIE L*a*b* color space, the neutral density filter is selected such that a*=b*=0 and L*<50. In other embodiments, the neutral density filter is selected such that a*=b*=0 and L*<60, and in still other embodiments, the neutral density filter is selected such that a*=b*=0 and L*<75.

Disposed on the neutral density filter 122 is the ink layer 124. As will be discussed more fully below, the ink layer 124 is selected based on its reflection coefficient. In embodiments, the reflection coefficient of the ink used in the ink layer 124 is between 0.1% and 5%. In a further embodiment, the ink reflection coefficient is from 1% to 4%. The ink layer 124 is an opaque layer (i.e., transmittance of visible light of <5%, or preferably, a transmittance of 0%) that blocks visibility of any components beneath the deadfront 106 in these regions. For example, the ink layer 124 may be used to block visibility of connections to the display unit 108 below the deadfront 106, a border of the display unit 108, circuitry, etc. Thus, in embodiments, the ink layer 124 is used to define a display region 132 of the deadfront 106, i.e., a region intended to be seen by a viewer when the display unit is on, and non-display regions 134 of the deadfront 106, i.e., regions not intended to be viewed by the viewer regardless of whether the display is off or on. In embodiments, the ink layer 124 is selected to have an optical density of at least 3. The ink layer 124 may be applied using screen printing, inject printing, spin coating, and various lithographic techniques, among others. In embodiments, the ink layer 124 has a thickness of from 1 μm to 20 μm. In embodiments, the ink layer 124 is also selected to be gray or black in color; however, other colors are also possible depending on the need to match any other colors in the deadfront 106.

The ink layer 124 is disposed on the neutral density filter 122 and helps to diminish the visual effect created by the internal reflectivity of the display unit 108. In this way, the ink layer 124 prevents a high contrast between display regions and non-display regions covered by the deadfront 106 so that, when viewing the second major surface 128, a viewer would not be able to distinguish between the display and non-display regions when the display is off.

Contrast sensitivity is a way to quantify how easily a human eye can distinguish between two regions of different contrasts. Contrast sensitivity as used herein in calculated according to the following formula:

$$CS \approx R_N + R_I / |R_D - R_I|$$

CS is the contrast sensitivity, $R_N$ is the reflectance off the second major surface 128 of the substrate, $R_1$ is the reflectance of the ink, and $R_D$ is the internal reflectance of the display. Exemplary representations of each of $R_N$, $R_I$, and $R_D$ are shown in FIG. 2.

According to this formula, a contrast sensitivity of at least 20 is not perceptible by the average human eye. Thus, in embodiments, the deadfront 106 has a contrast sensitivity of at least 15 between display regions 132 and non-display regions 134 when the display unit 108 is off. In other embodiments, the deadfront 106 has a contrast sensitivity of at least 17 between display regions 132 and non-display regions 134 when the display unit 108 is off. In still other embodiments, the deadfront 106 has a contrast sensitivity of at least 20 between display regions 132 and non-display regions 134.

Figure 3:
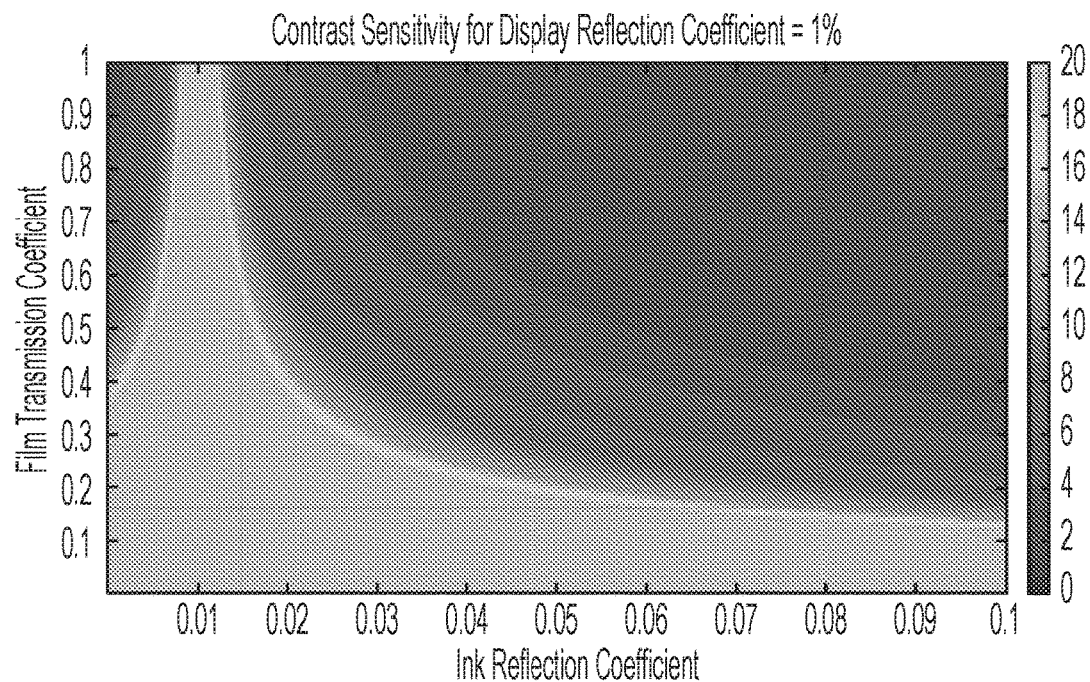
FIG. 3 is a graph of contrast sensitivity based on ink reflection coefficient and film transmission coefficient for a display having a reflection coefficient of 1%, according to an exemplary embodiment.

A particular contrast sensitivity is achieved by taking into account the transparency of the neutral density filter 122, the reflection coefficient of the ink in the ink layer 124, and the reflection coefficient of the display unit 108. For example, FIG. 3 provides a graph depicting the contrast sensitivity between display regions 132 and non-display regions 134 as a function of the transmission coefficient of the neutral density filter 122 and the reflection coefficient of the ink in the ink layer 124 for a display unit having an internal reflectivity coefficient of 1%. The level of contrast sensitivity is shown in a spectrum of colors with a deep blue representing a contrast sensitivity of 0 and yellow representing a contrast sensitivity of 20. As can be seen for a neutral density filter 122 having a relatively high transmittance of from 60% to 80%, a contrast sensitivity of 20 can be achieved using an ink having a reflection coefficient of about 1%.

Figure 4:
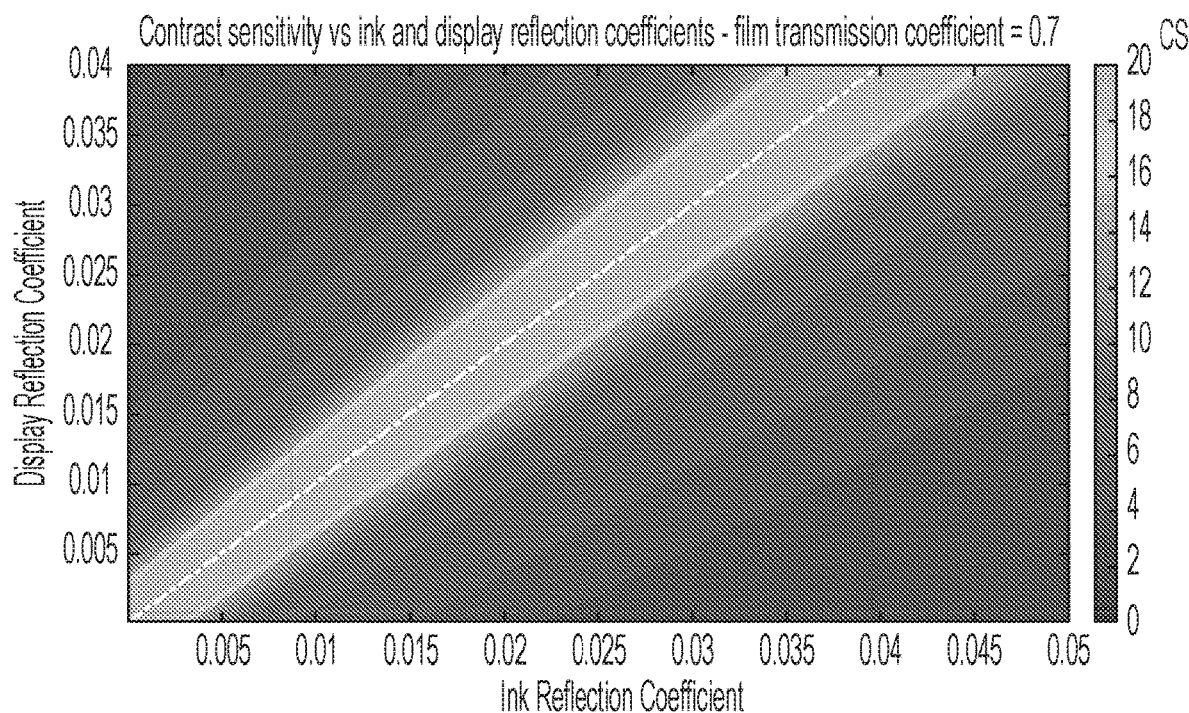
FIG. 4 is a graph of contrast sensitivity based on ink reflection coefficient and display reflection coefficient for a film having a transmission coefficient of 0.7, according to an exemplary embodiment.

FIG. 4 provides a graph depicting the contrast sensitivity as a function of the reflection coefficient of the display unit 108 and of the reflection coefficient of the ink in the ink layer 124 for a neutral density filter 122 having a transmittance of 70%. As with FIG. 3, the yellow region represents a contrast sensitivity of 20. Thus, based on FIG. 4, an ink for the ink layer 124 could be selected based on a reflection coefficient for a given display unit 108 and based on the transmission coefficient of a given neutral density filter 122. For example, given a display unit 108 with a reflection coefficient of 3% and a neutral density filter 122 with a transmission coefficient of 70%, an ink having a reflection coefficient of 3% would provide the desired color matching between the display region 132 and non-display regions 134 for a deadfront 106.

Advantageously, a deadfront 106 constructed in the manner described does not substantially diminish the brightness of the underlying display unit 108. More particularly, by using a neutral density filter 122 with a high transmittance, the brightness of the display 108 is not substantially reduced. For example, in embodiments, the brightness of the display unit 108 as viewed from the second major surface 128 is within 40% of the brightness of the display unit 108 incident on the backside of the deadfront 106. In other embodiments, the brightness of the display unit 108 as viewed from the second major surface 128 is within 30% of the brightness of the display unit 108 incident on the backside of the deadfront 106. In other embodiments, the brightness of the display unit 108 as viewed from the second major surface 128 is within 20% of the brightness of the display unit 108 incident on the backside of the deadfront 106.

Further, in any of the various embodiments described herein, the deadfront 106 seeks to minimize any distortions to the underlying image, graphic, icon, etc. on the display unit 108 as perceived by a user of the electronic device 100 in which the deadfront 106 is incorporated. That is, colors visible to a viewer through the deadfront 106 are substantially similar to the colors output by the display unit 108 of the electronic device. With reference to the CIE L*a*b* color space, the difference in each of the L*, a*, and b* values from those values output by the display unit and those values perceived by a viewer is less than 10 in embodiments. In further embodiments, the difference for each of the L*, a*, and b* values is less than 5, and in still other embodiments, the difference for each of the L*, a*, and b* values is less than 2. Using the CIE L*a*b* color system, differences between two colors can be quantified using $\Delta E^*_{ab}$, which can be calculated in various ways according to CIE76, CIE94, and CIE00. Using any one of the calculation methods for $\Delta E^*_{ab}$, the color difference is less than 20 in embodiments. In further embodiments, the color difference $\Delta E^*ab$ is less than 10, and in still other embodiments, the color difference $\Delta E^*_{ab}$ is less than 2.

Embodiments of the deadfront 106 disclosed herein provide several advantages. For example, the deadfront 106 allows uniform visual properties from macro to micro areas as well as tunable optical performance. Further, the deadfront 106 can be overlaid on any bright display with minimal change of the electronic device's functions and attributes, such as touch functionality, screen resolution, and color. Additionally, the deadfront 106 allows for the creation of extra functionality, such as half-mirror finish, extra switching, low-reflective neutral color, or metallic and special color effect when display(s) is(are) off. Further, in certain embodiments, the deadfront 106 is lamination ready with optical clear adhesive (OCA) to any type of display application, such as home electronics, auto-interior, medical, industrial device control and displays, etc. Moreover, standard industrial coating processes are utilized in constructing the deadfront 106, which allows for ease in scaling for mass production.

Referring to FIGS. 5-9, various sizes, shapes, curvatures, glass materials, etc. for a glass-based deadfront along with various processes for forming a curved glass-based deadfront are shown and described. It should be understood, that while FIGS. 5-9 are described in the context of a simplified curved deadfront structure 2000 for ease of explanation, deadfront structure 2000 may be any of the deadfront embodiments discussed herein.

Figure 5:
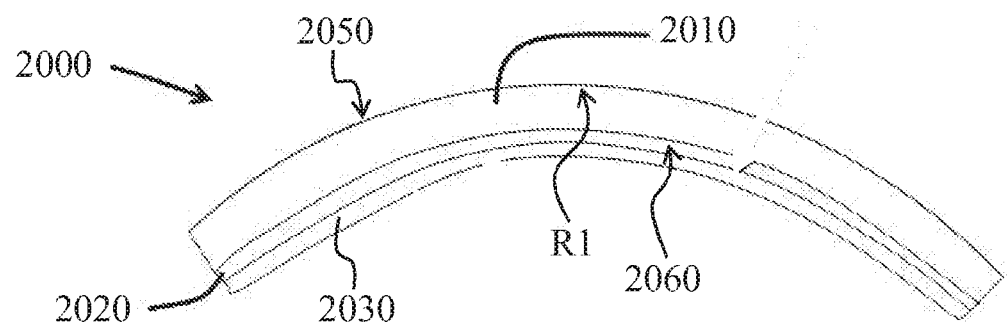
FIG. 5 is a side view of a curved deadfront for use with a display, according to an exemplary embodiment.

As shown in FIG. 5, in one or more embodiments, deadfront 2000 includes a curved outer glass layer 2010 (e.g., substrate 120) having at least a first radius of curvature, R1, and in various embodiments, curved outer glass layer 2010 is a complex curved sheet of glass material having at least one additional radius of curvature. In various embodiments, R1 is in a range from about 60 mm to about 1500 mm.

Curved deadfront 2000 includes a polymer layer 2020 located along an inner, major surface of curved outer glass layer 2010. Curved deadfront 2000 also includes metal layer 2030. Still further, curved deadfront 2000 may also include any of the other layers described above, such as the surface treatment, the ink layer, and the optically clear adhesive. Additionally, curved deadfront 2000 may include such layers as, e.g., high optical density layers, light guide layers, reflector layers, display module(s), display stack layers, light sources, etc. that otherwise may be associated with an electronic device as discussed herein.

As will be discussed in more detail below, in various embodiments, curved deadfront 2000 including glass layer 2010, polymer layer 2020, metal layer 2030, and any other optional layers may be cold-formed together to a curved shape, as shown in FIG. 5. In other embodiments, glass layer 2010 may be formed to a curved shape, and then layers 2020 and 2030 are applied following curve formation.

Figure 6:
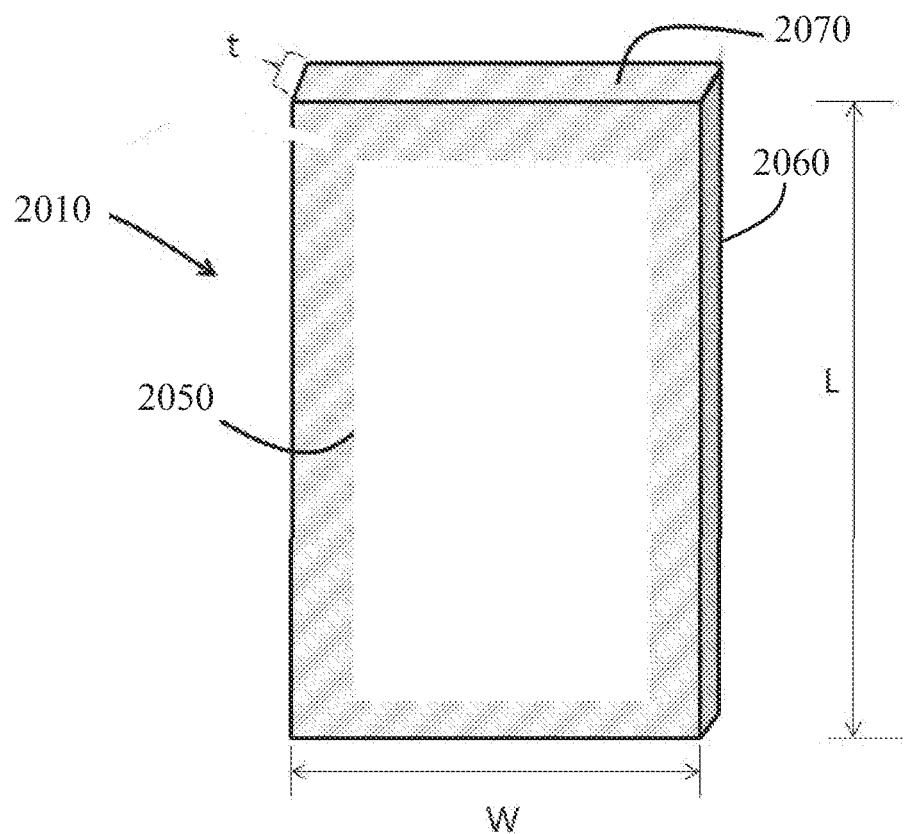
FIG. 6 is a front perspective view of a glass substrate for the deadfront of FIG. 2 prior to curve formation, according to an exemplary embodiment.

Referring to FIG. 6, outer glass layer 2010 is shown prior to being formed to the curved shape shown in FIG. 6. In general, Applicant believes that the articles and processes discussed herein provide high quality deadfront structures utilizing glass of sizes, shapes, compositions, strengths, etc. not previously provided.

As shown in FIG. 6, outer glass layer 2010 includes a first major surface 2050 and a second major surface 2060 opposite first major surface 2050. An edge surface or minor surface 2070 connects the first major surface 2050 and the second major surface 2060. Outer glass layer 2010 has a thickness (t) that is substantially constant and is defined as a distance between the first major surface 2050 and the second major surface 2060. In some embodiments, the thickness (t) as used herein refers to the maximum thickness of the outer glass layer 2010. Outer glass layer 2010 includes a width (W) defined as a first maximum dimension of one of the first or second major surfaces orthogonal to the thickness (t), and outer glass layer 2010 also includes a length (L) defined as a second maximum dimension of one of the first or second surfaces orthogonal to both the thickness and the width. In other embodiments, the dimensions discussed herein are average dimensions.

In one or more embodiments, outer glass layer 2010 has a thickness (t) that is in a range from 0.05 mm to 2 mm. In various embodiments, outer glass layer 2010 has a thickness (t) that is about 1.5 mm or less. For example, the thickness may be in a range from about 0.1 mm to about 1.5 mm, from about 0.15 mm to about 1.5 mm, from about 0.2 mm to about 1.5 mm, from about 0.25 mm to about 1.5 mm, from about 0.3 mm to about 1.5 mm, from about 0.35 mm to about 1.5 mm, from about 0.4 mm to about 1.5 mm, from about 0.45 mm to about 1.5 mm, from about 0.5 mm to about 1.5 mm, from about 0.55 mm to about 1.5 mm, from about 0.6 mm to about 1.5 mm, from about 0.65 mm to about 1.5 mm, from about 0.7 mm to about 1.5 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1.05 mm, from about 0.1 mm to about 1 mm, from about 0.1 mm to about 0.95 mm, from about 0.1 mm to about 0.9 mm, from about 0.1 mm to about 0.85 mm, from about 0.1 mm to about 0.8 mm, from about 0.1 mm to about 0.75 mm, from about 0.1 mm to about 0.7 mm, from about 0.1 mm to about 0.65 mm, from about 0.1 mm to about 0.6 mm, from about 0.1 mm to about 0.55 mm, from about 0.1 mm to about 0.5 mm, from about 0.1 mm to about 0.4 mm, or from about 0.3 mm to about 0.7 mm.

In one or more embodiments, outer glass layer 2010 has a width (W) in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 100 cm, from about 5 cm to about 90 cm, from about 5 cm to about 80 cm, or from about 5 cm to about 75 cm.

In one or more embodiments, outer glass layer 2010 has a length (L) in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 100 cm, from about 5 cm to about 90 cm, from about 5 cm to about 80 cm, or from about 5 cm to about 75 cm.

As shown in FIG. 5, outer glass layer 2010 is shaped to a curved shaping having at least one radius of curvature, shown as R1. In various embodiments, outer glass layer 2010 may be shaped to the curved shape via any suitable process, including cold-forming and hot-forming.

Figure 9:
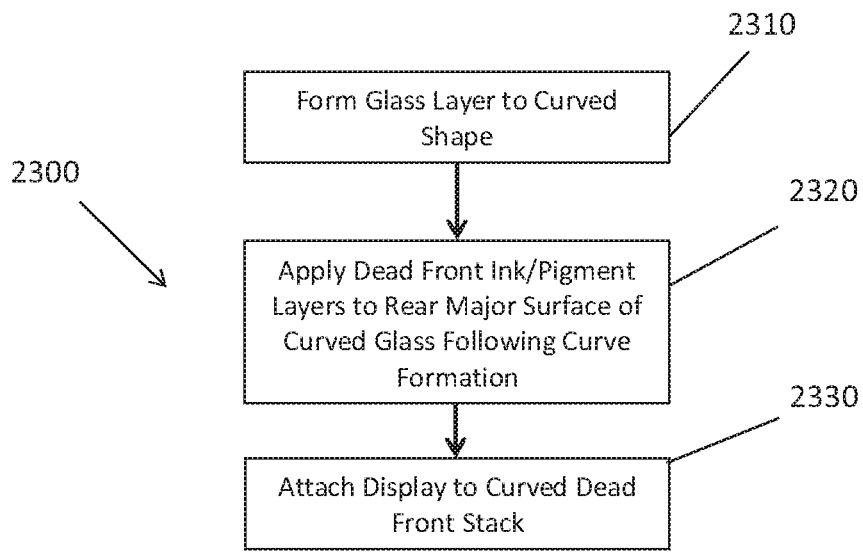
FIG. 9 shows a process for forming a curved glass deadfront utilizing a curved glass layer, according to an exemplary embodiment.

In specific embodiments, outer glass layer 2010 is shaped to the curved shape shown in FIG. 9, either alone, or following attachment of layers 2020 and 2030, via a cold-forming process. As used herein, the terms "cold-bent," "cold-bending," "cold-formed" or "cold-forming" refers to curving the glass deadfront at a cold-form temperature which is less than the softening point of the glass (as described herein). A feature of a cold-formed glass layer is an asymmetric surface compressive between the first major surface 2050 and the second major surface 2060. In some embodiments, prior to the cold-forming process or being cold-formed, the respective compressive stresses in the first major surface 2050 and the second major surface 2060 are substantially equal.

In some such embodiments in which outer glass layer 2010 is unstrengthened, the first major surface 2050 and the second major surface 2060 exhibit no appreciable compressive stress, prior to cold-forming. In some such embodiments in which outer glass layer 2010 is strengthened (as described herein), the first major surface 2050 and the second major surface 2060 exhibit substantially equal compressive stress with respect to one another, prior to cold-forming. In one or more embodiments, after cold-forming the compressive stress on the second major surface 2060 (e.g., the concave surface following bending) increases (i.e., the compressive stress on the second major surface 2050 is greater after cold-forming than before cold-forming).

Without being bound by theory, the cold-forming process increases the compressive stress of the glass article being shaped to compensate for tensile stresses imparted during bending and/or forming operations. In one or more embodiments, the cold-forming process causes the second major surface 2060 to experience compressive stresses, while the first major surface 2050 (e.g., the convex surface following bending) experiences tensile stresses. The tensile stress experienced by surface 2050 following bending results in a net decrease in surface compressive stress, such that the compressive stress in surface 2050 of a strengthened glass sheet following bending is less than the compressive stress in surface 2050 when the glass sheet is flat.

Further, when a strengthened glass sheet is utilized for outer glass layer 2010, the first major surface and the second major surface (2050, 2060) are already under compressive stress, and thus first major surface 2050 can experience greater tensile stress during bending without risking fracture. This allows for the strengthened embodiments of outer glass layer 2010 to conform to more tightly curved surfaces (e.g., shaped to have smaller R1 values).

In various embodiments, the thickness of outer glass layer 2010 is tailored to allow outer glass layer 2010 to be more flexible to achieve the desired radius of curvature. Moreover, a thinner outer glass layer 2010 may deform more readily, which could potentially compensate for shape mismatches and gaps that may be created by the shape of a support or frame (as discussed below). In one or more embodiments, a thin and strengthened outer glass layer 2010 exhibits greater flexibility especially during cold-forming. The greater flexibility of the glass articles discussed herein may allow for consistent bend formation without heating.

In various embodiments, outer glass layer 2010 (and consequently deadfront 2000) may have a compound curve including a major radius and a cross curvature. A complexly curved cold-formed outer glass layer 2010 may have a distinct radius of curvature in two independent directions. According to one or more embodiments, the complexly curved cold-formed outer glass layer 2010 may thus be characterized as having "cross curvature," where the cold-formed outer glass layer 2010 is curved along an axis (i.e., a first axis) that is parallel to a given dimension and also curved along an axis (i.e., a second axis) that is perpendicular to the same dimension. The curvature of the cold-formed outer glass layer 2010 can be even more complex when a significant minimum radius is combined with a significant cross curvature, and/or depth of bend.

Figure 7:
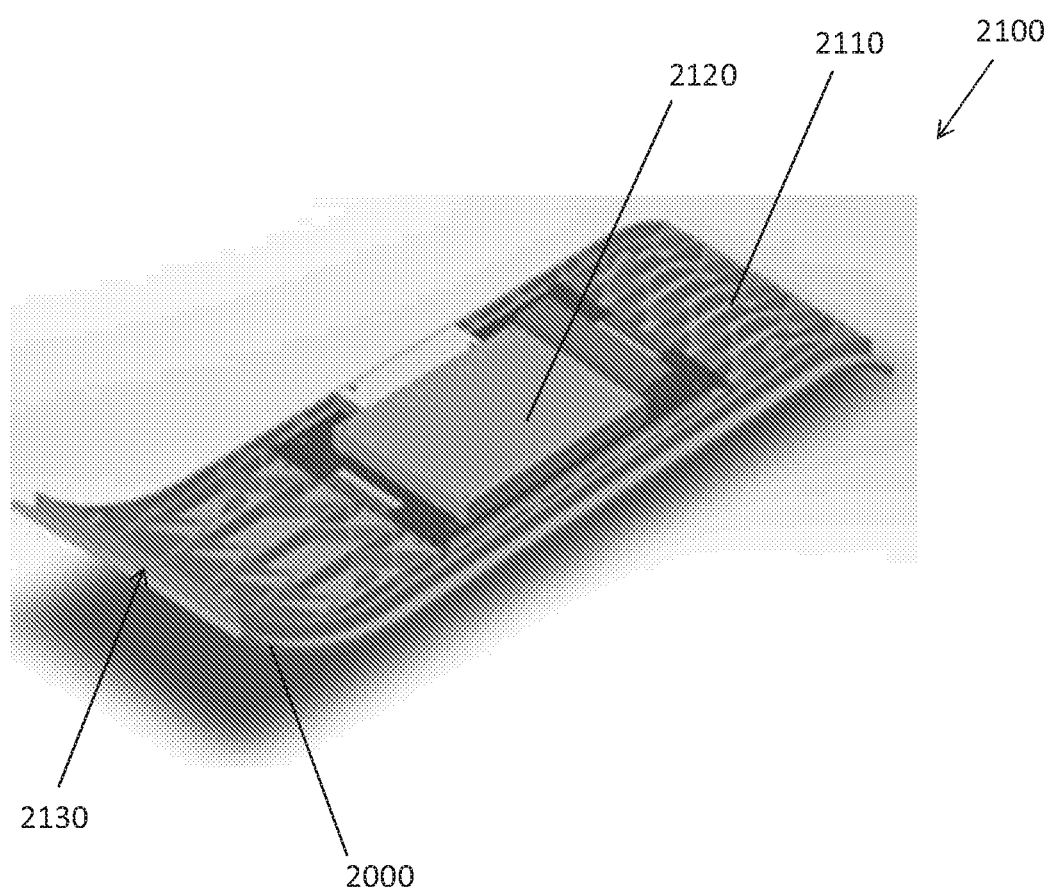
FIG. 7 shows a curved glass deadfront shaped to conform to a curved display frame, according to an exemplary embodiment.

Referring to FIG. 7, display assembly 2100 is shown according to an exemplary embodiment. In the embodiment shown, display assembly 2100 includes frame 2110 supporting (either directly or indirectly) both a light source, shown as a display module 2120, and deadfront structure 2000. As shown in FIG. 7, deadfront structure 2000 and display module 2120 are coupled to frame 2110, and display module 2120 is positioned to allow a user to view light, images, etc. generated by display module 2120 through deadfront structure 2000. In various embodiments, frame 2110 may be formed from a variety of materials such as plastic (PC/ABS, etc.), metals (Al-alloys, Mg-alloys, Fe-alloys, etc.). Various processes such as casting, machining, stamping, injection molding, etc. may be utilized to form the curved shape of frame 2110. While FIG. 7 shows a light source in the form of a display module, it should be understood that display assembly 2100 may include any of the light sources discussed herein for producing graphics, icons, images, displays, etc. through any of the dead front embodiments discussed herein. Further, while frame 2110 is shown as a frame associated with a display assembly, frame 2110 may be any support or frame structure associated with a vehicle interior system.

In various embodiments, the systems and methods described herein allow for formation of deadfront structure 2000 to conform to a wide variety of curved shapes that frame 2110 may have. As shown in FIG. 7, frame 2110 has a support surface 2130 that has a curved shape, and deadfront structure 2000 is shaped to match the curved shape of support surface 2130. As will be understood, deadfront structure 2000 may be shaped into a wide variety of shapes to conform to a desired frame shape of a display assembly 2100, which in turn may be shaped to fit the shape of a portion of a vehicle interior system, as discussed herein.

In one or more embodiments, deadfront structure 2000 (and specifically outer glass layer 2010) is shaped to have a first radius of curvature, R1, of about 60 mm or greater. For example, R1 may be in a range from about 60 mm to about 1500 mm, from about 70 mm to about 1500 mm, from about 80 mm to about 1500 mm, from about 90 mm to about 1500 mm, from about 100 mm to about 1500 mm, from about 120 mm to about 1500 mm, from about 140 mm to about 1500 mm, from about 150 mm to about 1500 mm, from about 160 mm to about 1500 mm, from about 180 mm to about 1500 mm, from about 200 mm to about 1500 mm, from about 220 mm to about 1500 mm, from about 240 mm to about 1500 mm, from about 250 mm to about 1500 mm, from about 260 mm to about 1500 mm, from about 270 mm to about 1500 mm, from about 280 mm to about 1500 mm, from about 290 mm to about 1500 mm, from about 300 mm to about 1500 mm, from about 350 mm to about 1500 mm, from about 400 mm to about 1500 mm, from about 450 mm to about 1500 mm, from about 500 mm to about 1500 mm, from about 550 mm to about 1500 mm, from about 600 mm to about 1500 mm, from about 650 mm to about 1500 mm, from about 700 mm to about 1500 mm, from about 750 mm to about 1500 mm, from about 800 mm to about 1500 mm, from about 900 mm to about 1500 mm, from about 9500 mm to about 1500 mm, from about 1000 mm to about 1500 mm, from about 1250 mm to about 1500 mm, from about 60 mm to about 1400 mm, from about 60 mm to about 1300 mm, from about 60 mm to about 1200 mm, from about 60 mm to about 1100 mm, from about 60 mm to about 1000 mm, from about 60 mm to about 950 mm, from about 60 mm to about 900 mm, from about 60 mm to about 850 mm, from about 60 mm to about 800 mm, from about 60 mm to about 750 mm, from about 60 mm to about 700 mm, from about 60 mm to about 650 mm, from about 60 mm to about 600 mm, from about 60 mm to about 550 mm, from about 60 mm to about 500 mm, from about 60 mm to about 450 mm, from about 60 mm to about 400 mm, from about 60 mm to about 350 mm, from about 60 mm to about 300 mm, or from about 60 mm to about 250 mm.

In one or more embodiments, support surface 2130 has a second radius of curvature of about 60 mm or greater. For example, the second radius of curvature of support surface 2130 may be in a range from about 60 mm to about 1500 mm, from about 70 mm to about 1500 mm, from about 80 mm to about 1500 mm, from about 90 mm to about 1500 mm, from about 100 mm to about 1500 mm, from about 120 mm to about 1500 mm, from about 140 mm to about 1500 mm, from about 150 mm to about 1500 mm, from about 160 mm to about 1500 mm, from about 180 mm to about 1500 mm, from about 200 mm to about 1500 mm, from about 220 mm to about 1500 mm, from about 240 mm to about 1500 mm, from about 250 mm to about 1500 mm, from about 260 mm to about 1500 mm, from about 270 mm to about 1500 mm, from about 280 mm to about 1500 mm, from about 290 mm to about 1500 mm, from about 300 mm to about 1500 mm, from about 350 mm to about 1500 mm, from about 400 mm to about 1500 mm, from about 450 mm to about 1500 mm, from about 500 mm to about 1500 mm, from about 550 mm to about 1500 mm, from about 600 mm to about 1500 mm, from about 650 mm to about 1500 mm, from about 700 mm to about 1500 mm, from about 750 mm to about 1500 mm, from about 800 mm to about 1500 mm, from about 900 mm to about 1500 mm, from about 9500 mm to about 1500 mm, from about 1000 mm to about 1500 mm, from about 1250 mm to about 1500 mm, from about 60 mm to about 1400 mm, from about 60 mm to about 1300 mm, from about 60 mm to about 1200 mm, from about 60 mm to about 1100 mm, from about 60 mm to about 1000 mm, from about 60 mm to about 950 mm, from about 60 mm to about 900 mm, from about 60 mm to about 850 mm, from about 60 mm to about 800 mm, from about 60 mm to about 750 mm, from about 60 mm to about 700 mm, from about 60 mm to about 650 mm, from about 60 mm to about 600 mm, from about 60 mm to about 550 mm, from about 60 mm to about 500 mm, from about 60 mm to about 450 mm, from about 60 mm to about 400 mm, from about 60 mm to about 350 mm, from about 60 mm to about 300 mm, or from about 60 mm to about 250 mm.

In one or more embodiments, deadfront structure 2000 is cold-formed to exhibit a first radius curvature, R1, that is within 10% (e.g., about 10% or less, about 9% or less, about 8% or less, about 7% or less, about 6% or less, or about 5% or less) of the second radius of curvature of support surface 2130 of frame 2110. For example, support surface 2130 of frame 2110 exhibits a radius of curvature of 1000 mm, deadfront structure 2000 is cold-formed to have a radius of curvature in a range from about 900 mm to about 1100 mm.

In one or more embodiments, first major surface 2050 and/or second major surface 2060 of glass layer 2010 includes a surface treatment or a functional coating. The surface treatment may cover at least a portion of first major surface 2050 and/or second major surface 2060. Exemplary surface treatments include at least one or combinations of a glare reduction or anti-glare coating, an anti-glare surface (e.g., an etched surface), a scratch resistance coating, an anti-reflection coating, a half-mirror coating, easy-to-clean coating, or ink decoration.

Figure 8:
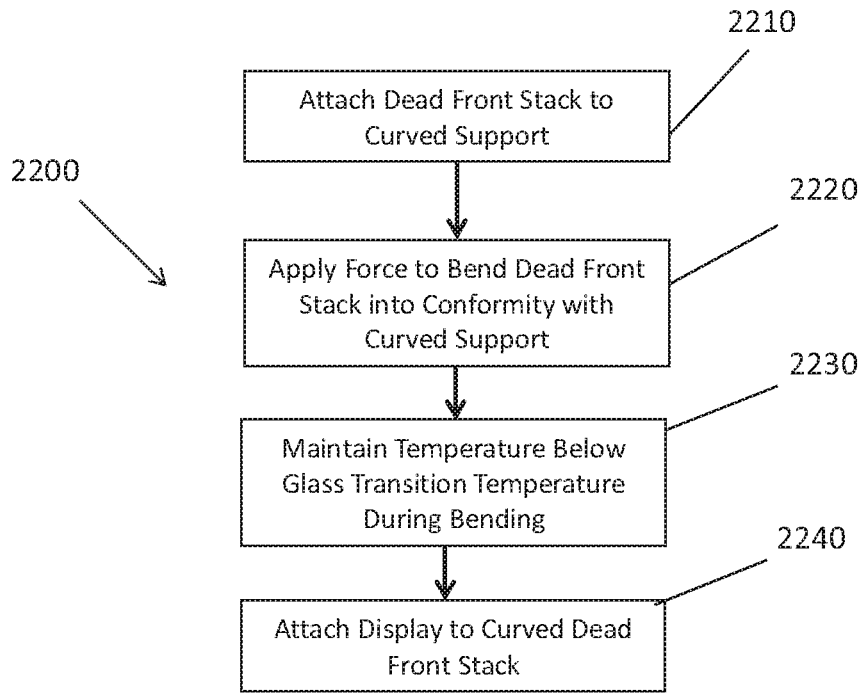
FIG. 8 shows a process for cold forming a glass deadfront to a curved shape, according to an exemplary embodiment.

Referring to FIG. 8, a method 2200 for forming a display assembly that includes a cold-formed deadfront structure, such as deadfront structure 2000 is shown. At step 2210, a deadfront stack or structure, such deadfront structure 2000, is supported and/or placed on a curved support. In general, the curved support may be a frame of a display, such as frame 2110, that defines a perimeter and curved shape of a vehicle display. In general, the curved frame includes a curved support surface, and one of the major surfaces 2050 and 2060 of deadfront structure 2000 is placed into contact with the curved support surface.

At step 2220, a force is applied to the deadfront structure while it is supported by the support causing the deadfront structure to bend into conformity with the curved shape of the support. In this manner, a curved deadfront structure 2000, as shown in FIG. 5, is formed from a generally flat deadfront structure. In this arrangement, curving the flat deadfront structure forms a curved shape on the major surface facing the support, while also causing a corresponding (but complimentary) curve to form in the major surface opposite of the frame. Applicant believes that by bending the deadfront structure directly on the curved frame, the need for a separate curved die or mold (typically needed in other glass bending processes) is eliminated. Further, Applicant believes that by shaping the deadfront directly to the curved frame, a wide range of curved radii may be achieved in a low complexity manufacturing process.

In some embodiments, the force applied in step 2220 may be air pressure applied via a vacuum fixture. In some other embodiments, the air pressure differential is formed by applying a vacuum to an airtight enclosure surrounding the frame and the deadfront structure. In specific embodiments, the airtight enclosure is a flexible polymer shell, such as a plastic bag or pouch. In other embodiments, the air pressure differential is formed by generating increased air pressure around the deadfront structure and the frame with an overpressure device, such as an autoclave. Applicant has further found that air pressure provides a consistent and highly uniform bending force (as compared to a contact-based bending method) which further leads to a robust manufacturing process. In various embodiments, the air pressure differential is between 0.5 and 1.5 atmospheres of pressure (atm), specifically between 0.7 and 1.1 atm, and more specifically is 0.8 to 1 atm.

At step 2230, the temperature of the deadfront structure is maintained below the glass transition temperature of the material of the outer glass layer during the bending. As such, method 2200 is a cold-forming or cold-bending process. In particular embodiments, the temperature of the deadfront structure is maintained below 500 degrees C., 400 degrees C., 300 degrees C., 200 degrees C. or 100 degrees C. In a particular embodiment, the deadfront structure is maintained at or below room temperature during bending. In a particular embodiment, the deadfront structure is not actively heated via a heating element, furnace, oven, etc. during bending, as is the case when hot-forming glass to a curved shape.

As noted above, in addition to providing processing advantages such as eliminating expensive and/or slow heating steps, the cold-forming processes discussed herein are believed to generate curved deadfront structures with a variety of properties that are believed to be superior to those achievable via hot-forming processes. For example, Applicant believes that, for at least some glass materials, heating during hot-forming processes decreases optical properties of curved glass sheets, and thus, the curved glass based deadfronts formed utilizing the cold-bending processes/systems discussed herein provide for both curved glass shape along with improved optical qualities not believed achievable with hot-bending processes.

Further, many glass coating materials (e.g., anti-glare coatings, anti-reflective coatings, etc.) are applied via deposition processes, such as sputtering processes, that are typically ill-suited for coating on to a curved surface. In addition, many coating materials, such as the polymer layer, also are not able to survive the high temperatures associated with hot-bending processes. Thus, in particular embodiments discussed herein, layer 2020 is applied to outer glass layer 2010 prior to cold-bending. Thus, Applicant believes that the processes and systems discussed herein allow for bending of glass after one or more coating material has been applied to the glass, in contrast to typical hot-forming processes.

At step 2240, the curved deadfront structure is attached or affixed to the curved support. In various embodiments, the attachment between the curved deadfront structure and the curved support may be accomplished via an adhesive material. Such adhesives may include any suitable optically clear adhesive for bonding the deadfront structure in place relative to the display assembly (e.g., to the frame of the display). In one example, the adhesive may include an optically clear adhesive available from 3M Corporation under the trade name 8215. The thickness of the adhesive may be in a range from about 200 μm to about 500 μm.

The adhesive material may be applied in a variety ways. In one embodiment, the adhesive is applied using an applicator gun and made uniform using a roller or a draw down die. In various embodiments, the adhesives discussed herein are structural adhesives. In particular embodiments, the structural adhesives may include an adhesive selected from one or more of the categories: (a) Toughened Epoxy (Masterbond EP21TDCHT-LO, 3M Scotch Weld Epoxy DP460 Off-white); (b) Flexible Epoxy (Masterbond EP21TDC-2LO, 3M Scotch Weld Epoxy 2216 B/A Gray); (c) Acrylic (LORD Adhesive 410/Accelerator 19 w/LORD AP 134 primer, LORD Adhesive 852/LORD Accelerator 25 GB, Loctite HF8000, Loctite AA4800); (d) Urethanes (3M Scotch Weld Urethane DP640 Brown); and (e) Silicones (Dow Corning 995). In some cases, structural glues available in sheet format (such as B-staged epoxy adhesives) may be utilized. Furthermore, pressure sensitive structural adhesives such as 3M VHB tapes may be utilized. In such embodiments, utilizing a pressure sensitive adhesive allows for the curved deadfront structure to be bonded to the frame without the need for a curing step.

Referring to FIG. 9, method 2300 for forming a display utilizing a curved deadfront structure is shown and described. In some embodiments, the glass layer (e.g., outer glass layer 2010) of a deadfront structure is formed to curved shape at step 2310. Shaping at step 2310 may be either cold-forming or hot-forming. At step 2320, the deadfront polymer layer 2020, metal layer 2030, and any of the other optional layers are applied to the glass layer following shaping. Next at step 2330, the curved deadfront structure is attached to a frame, such as frame 2110 of display assembly 2100, or other frame that may be associated with a vehicle interior system.

Glass Materials

The various glass layer(s) of the deadfront structures discussed herein, such as outer glass layer 2010, may be formed from any suitable glass composition including soda lime glass, aluminosilicate glass, borosilicate glass, boroaluminosilicate glass, alkali-containing aluminosilicate glass, alkali-containing borosilicate glass, and alkali-containing boroaluminosilicate glass.

Unless otherwise specified, the glass compositions disclosed herein are described in mole percent (mol %) as analyzed on an oxide basis.

In one or more embodiments, the glass composition may include $SiO_2$ in an amount in a range from about 66 mol % to about 80 mol %, from about 67 mol % to about 80 mol %, from about 68 mol % to about 80 mol %, from about 69 mol % to about 80 mol %, from about 70 mol % to about 80 mol %, from about 72 mol % to about 80 mol %, from about 65 mol % to about 78 mol %, from about 65 mol % to about 76 mol %, from about 65 mol % to about 75 mol %, from about 65 mol % to about 74 mol %, from about 65 mol % to about 72 mol %, or from about 65 mol % to about 70 mol %, and all ranges and sub-ranges therebetween.

In one or more embodiments, the glass composition includes $Al_2O_3$ in an amount greater than about 4 mol %, or greater than about 5 mol %. In one or more embodiments, the glass composition includes $Al_2O_3$ in a range from greater than about 7 mol % to about 15 mol %, from greater than about 7 mol % to about 14 mol %, from about 7 mol % to about 13 mol %, from about 4 mol % to about 12 mol %, from about 7 mol % to about 11 mol %, from about 8 mol % to about 15 mol %, from 9 mol % to about 15 mol %, from about 9 mol % to about 15 mol %, from about 10 mol % to about 15 mol %, from about 11 mol % to about 15 mol %, or from about 12 mol % to about 15 mol %, and all ranges and sub-ranges therebetween. In one or more embodiments, the upper limit of $Al_2O_3$ may be about 14 mol %, 14.2 mol %, 14.4 mol %, 14.6 mol %, or 14.8 mol %.

In one or more embodiments, glass layer(s) herein are described as an aluminosilicate glass article or including an aluminosilicate glass composition. In such embodiments, the glass composition or article formed therefrom includes $SiO_2$ and $Al_2O_3$ and is not a soda lime silicate glass. In this regard, the glass composition or article formed therefrom includes $Al_2O_3$ in an amount of about 2 mol % or greater, 2.25 mol % or greater, 2.5 mol % or greater, about 2.75 mol % or greater, about 3 mol % or greater.

In one or more embodiments, the glass composition comprises $B_2O_3$ (e.g., about 0.01 mol % or greater). In one or more embodiments, the glass composition comprises $B_2O_3$ in an amount in a range from about 0 mol % to about 5 mol %, from about 0 mol % to about 4 mol %, from about 0 mol % to about 3 mol %, from about 0 mol % to about 2 mol %, from about 0 mol % to about 1 mol %, from about 0 mol % to about 0.5 mol %, from about 0.1 mol % to about 5 mol %, from about 0.1 mol % to about 4 mol %, from about 0.1 mol % to about 3 mol %, from about 0.1 mol % to about 2 mol %, from about 0.1 mol % to about 1 mol %, from about 0.1 mol % to about 0.5 mol %, and all ranges and sub-ranges therebetween. In one or more embodiments, the glass composition is substantially free of $B_2O_3$.

As used herein, the phrase "substantially free" with respect to the components of the composition means that the component is not actively or intentionally added to the composition during initial batching, but may be present as an impurity in an amount less than about 0.001 mol %.

In one or more embodiments, the glass composition optionally comprises $P_2O_5$ (e.g., about 0.01 mol % or greater). In one or more embodiments, the glass composition comprises a non-zero amount of $P_2O_5$ up to and including 2 mol %, 1.5 mol %, 1 mol %, or 0.5 mol %. In one or more embodiments, the glass composition is substantially free of $P_2O_5$.

In one or more embodiments, the glass composition may include a total amount of $R_2O$ (which is the total amount of alkali metal oxide such as $Li_2O$, $Na_2O$, $K_2O$, $Rb_2O$, and $Cs_2O$) that is greater than or equal to about 8 mol %, greater than or equal to about 10 mol %, or greater than or equal to about 12 mol %. In some embodiments, the glass composition includes a total amount of $R_2O$ in a range from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 13 mol %, and all ranges and sub-ranges therebetween. In one or more embodiments, the glass composition may be substantially free of $Rb_2O$, $Cs_2O$ or both $Rb_2O$ and $Cs_2O$. In one or more embodiments, the $R_2O$ may include the total amount of $Li_2O$, $Na_2O$ and $K_2O$ only. In one or more embodiments, the glass composition may comprise at least one alkali metal oxide selected from $Li_2O$, $Na_2O$ and $K_2O$, wherein the alkali metal oxide is present in an amount greater than about 8 mol % or greater.

In one or more embodiments, the glass composition comprises $Na_2O$ in an amount greater than or equal to about 8 mol %, greater than or equal to about 10 mol %, or greater than or equal to about 12 mol %. In one or more embodiments, the composition includes $Na_2O$ in a range from about from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 16 mol %, and all ranges and sub-ranges therebetween.

In one or more embodiments, the glass composition includes less than about 4 mol % $K_2O$, less than about 3 mol % $K_2O$, or less than about 1 mol % $K_2O$. In some instances, the glass composition may include $K_2O$ in an amount in a range from about 0 mol % to about 4 mol %, from about 0 mol % to about 3.5 mol %, from about 0 mol % to about 3 mol %, from about 0 mol % to about 2.5 mol %, from about 0 mol % to about 2 mol %, from about 0 mol % to about 1.5 mol %, from about 0 mol % to about 1 mol %, from about 0 mol % to about 0.5 mol %, from about 0 mol % to about 0.2 mol %, from about 0 mol % to about 0.1 mol %, from about 0.5 mol % to about 4 mol %, from about 0.5 mol % to about 3.5 mol %, from about 0.5 mol % to about 3 mol %, from about 0.5 mol % to about 2.5 mol %, from about 0.5 mol % to about 2 mol %, from about 0.5 mol % to about 1.5 mol %, or from about 0.5 mol % to about 1 mol %, and all ranges and sub-ranges therebetween. In one or more embodiments, the glass composition may be substantially free of $K_2O$.

In one or more embodiments, the glass composition is substantially free of $Li_2O$.

In one or more embodiments, the amount of $Na_2O$ in the composition may be greater than the amount of $Li_2O$. In some instances, the amount of $Na_2O$ may be greater than the combined amount of $Li_2O$ and $K_2O$. In one or more alternative embodiments, the amount of $Li_2O$ in the composition may be greater than the amount of $Na_2O$ or the combined amount of $Na_2O$ and $K_2O$.

In one or more embodiments, the glass composition may include a total amount of RO (which is the total amount of alkaline earth metal oxide such as CaO, MgO, BaO, ZnO and SrO) in a range from about 0 mol % to about 2 mol %. In some embodiments, the glass composition includes a non-zero amount of RO up to about 2 mol %. In one or more embodiments, the glass composition comprises RO in an amount from about 0 mol % to about 1.8 mol %, from about 0 mol % to about 1.6 mol %, from about 0 mol % to about 1.5 mol %, from about 0 mol % to about 1.4 mol %, from about 0 mol % to about 1.2 mol %, from about 0 mol % to about 1 mol %, from about 0 mol % to about 0.8 mol %, from about 0 mol % to about 0.5 mol %, and all ranges and sub-ranges therebetween.

In one or more embodiments, the glass composition includes CaO in an amount less than about 1 mol %, less than about 0.8 mol %, or less than about 0.5 mol %. In one or more embodiments, the glass composition is substantially free of CaO. In some embodiments, the glass composition comprises MgO in an amount from about 0 mol % to about 7 mol %, from about 0 mol % to about 6 mol %, from about 0 mol % to about 5 mol %, from about 0 mol % to about 4 mol %, from about 0.1 mol % to about 7 mol %, from about 0.1 mol % to about 6 mol %, from about 0.1 mol % to about 5 mol %, from about 0.1 mol % to about 4 mol %, from about 1 mol % to about 7 mol %, from about 2 mol % to about 6 mol %, or from about 3 mol % to about 6 mol %, and all ranges and sub-ranges therebetween.

In one or more embodiments, the glass composition comprises $ZrO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $ZrO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition comprises $SnO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $SnO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition may include an oxide that imparts a color or tint to the glass articles. In some embodiments, the glass composition includes an oxide that prevents discoloration of the glass article when the glass article is exposed to ultraviolet radiation. Examples of such oxides include, without limitation oxides of: Ti, V, Cr, Mn, Fe, Co, Ni, Cu, Ce, W, and Mo.

In one or more embodiments, the glass composition includes Fe expressed as $Fe_2O_3$, wherein Fe is present in an amount up to (and including) about 1 mol %. In some embodiments, the glass composition is substantially free of Fe. In one or more embodiments, the glass composition comprises $Fe_2O_3$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $Fe_2O_3$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

Where the glass composition includes $TiO_2$, $TiO_2$ may be present in an amount of about 5 mol % or less, about 2.5 mol % or less, about 2 mol % or less or about 1 mol % or less. In one or more embodiments, the glass composition may be substantially free of $TiO_2$.

An exemplary glass composition includes $SiO_2$ in an amount in a range from about 65 mol % to about 75 mol %, $Al_2O_3$ in an amount in a range from about 8 mol % to about 14 mol %, $Na_2O$ in an amount in a range from about 12 mol % to about 17 mol %, $K_2O$ in an amount in a range of about 0 mol % to about 0.2 mol %, and MgO in an amount in a range from about 1.5 mol % to about 6 mol %. Optionally, $SnO_2$ may be included in the amounts otherwise disclosed herein.

Strengthened Glass Properties

In one or more embodiments, outer glass layer 2010 or other glass layer of any of the deadfront embodiments discussed herein may be formed from a strengthened glass sheet or article. In one or more embodiments, the glass articles used to form the layer(s) of the deadfront structures discussed herein may be strengthened to include compressive stress that extends from a surface to a depth of compression (DOC). The compressive stress regions are balanced by a central portion exhibiting a tensile stress. At the DOC, the stress crosses from a positive (compressive) stress to a negative (tensile) stress.

In one or more embodiments, the glass articles used to form the layer(s) of the deadfront structures discussed herein may be strengthened mechanically by utilizing a mismatch of the coefficient of thermal expansion between portions of the glass to create a compressive stress region and a central region exhibiting a tensile stress. In some embodiments, the glass article may be strengthened thermally by heating the glass to a temperature above the glass transition point and then rapidly quenching.

In one or more embodiments, the glass articles used to form the layer(s) of the deadfront structures discussed herein may be chemically strengthening by ion exchange. In the ion exchange process, ions at or near the surface of the glass article are replaced by—or exchanged with—larger ions having the same valence or oxidation state. In those embodiments in which the glass article comprises an alkali aluminosilicate glass, ions in the surface layer of the article and the larger ions are monovalent alkali metal cations, such as Li+, Na+, K+, Rb+, and Cs+. Alternatively, monovalent cations in the surface layer may be replaced with monovalent cations other than alkali metal cations, such as Ag+ or the like. In such embodiments, the monovalent ions (or cations) exchanged into the glass article generate a stress.

Ion exchange processes are typically carried out by immersing a glass article in a molten salt bath (or two or more molten salt baths) containing the larger ions to be exchanged with the smaller ions in the glass article. It should be noted that aqueous salt baths may also be utilized. In addition, the composition of the bath(s) may include more than one type of larger ion (e.g., Na+ and K+) or a single larger ion. It will be appreciated by those skilled in the art that parameters for the ion exchange process, including, but not limited to, bath composition and temperature, immersion time, the number of immersions of the glass article in a salt bath (or baths), use of multiple salt baths, additional steps such as annealing, washing, and the like, are generally determined by the composition of the glass layer(s) of a deadfront structure (including the structure of the article and any crystalline phases present) and the desired DOC and CS of the glass layer(s) of a deadfront structure that results from strengthening.

Exemplary molten bath composition may include nitrates, sulfates, and chlorides of the larger alkali metal ion. Typical nitrates include KNO3, NaNO3, LiNO3, NaSO4 and combinations thereof. The temperature of the molten salt bath typically is in a range from about 380° C. up to about 450° C., while immersion times range from about 15 minutes up to about 100 hours depending on the glass thickness, bath temperature and glass (or monovalent ion) diffusivity. However, temperatures and immersion times different from those described above may also be used.

In one or more embodiments, the glass articles used to form the layer(s) of the deadfront structures may be immersed in a molten salt bath of 100% NaNO3, 100% KNO3, or a combination of NaNO3 and KNO3 having a temperature from about 370° C. to about 480° C. In some embodiments, the glass layer(s) of a deadfront structure may be immersed in a molten mixed salt bath including from about 5% to about 90% KNO3 and from about 10% to about 95% NaNO3. In one or more embodiments, the glass article may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass articles used to form the layer(s) of the deadfront structures may be immersed in a molten, mixed salt bath including NaNO3 and KNO3 (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting glass layer(s) of a deadfront structure. The spike may result in a greater surface CS value. This spike can be achieved by single bath or multiple baths, with the bath(s) having a single composition or mixed composition, due to the unique properties of the glass compositions used in the glass layer(s) of a deadfront structure described herein.

In one or more embodiments, where more than one monovalent ion is exchanged into the glass articles used to form the layer(s) of the deadfront structures, the different monovalent ions may exchange to different depths within the glass layer (and generate different magnitudes stresses within the glass article at different depths). The resulting relative depths of the stress-generating ions can be determined and cause different characteristics of the stress profile.

CS is measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the glass article. In other embodiments, the maximum compressive stress may occur at a depth below the surface, giving the compressive profile the appearance of a "buried peak."

DOC may be measured by FSM or by a scattered light polariscope (SCALP) (such as the SCALP-04 scattered light polariscope available from Glasstress Ltd., located in Tallinn Estonia), depending on the strengthening method and conditions. When the glass article is chemically strengthened by an ion exchange treatment, FSM or SCALP may be used depending on which ion is exchanged into the glass article. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass articles is measured by FSM. Central tension or CT is the maximum tensile stress and is measured by SCALP.

In one or more embodiments, the glass articles used to form the layer(s) of the deadfront structures maybe strengthened to exhibit a DOC that is described a fraction of the thickness t of the glass article (as described herein). For example, in one or more embodiments, the DOC may be equal to or greater than about 0.05 t, equal to or greater than about 0.1 t, equal to or greater than about 0.11 t, equal to or greater than about 0.12 t, equal to or greater than about 0.13 t, equal to or greater than about 0.14 t, equal to or greater than about 0.15 t, equal to or greater than about 0.16 t, equal to or greater than about 0.17 t, equal to or greater than about 0.18 t, equal to or greater than about 0.19 t, equal to or greater than about 0.2 t, equal to or greater than about 0.21 t. In some embodiments, The DOC may be in a range from about 0.08 t to about 0.25 t, from about 0.09 t to about 0.25 t, from about 0.18 t to about 0.25 t, from about 0.11 t to about 0.25 t, from about 0.12 t to about 0.25 t, from about 0.13 t to about 0.25 t, from about 0.14 t to about 0.25 t, from about 0.15 t to about 0.25 t, from about 0.08 t to about 0.24 t, from about 0.08 t to about 0.23 t, from about 0.08 t to about 0.22 t, from about 0.08 t to about 0.21 t, from about 0.08 t to about 0.2 t, from about 0.08 t to about 0.19 t, from about 0.08 t to about 0.18 t, from about 0.08 t to about 0.17 t, from about 0.08 t to about 0.16 t, or from about 0.08 t to about 0.15 t. In some instances, the DOC may be about 20 µm or less. In one or more embodiments, the DOC may be about 40 µm or greater (e.g., from about 40 µm to about 300 µm, from about 50 µm to about 300 µm, from about 60 µm to about 300 µm, from about 70 µm to about 300 µm, from about 80 µm to about 300 µm, from about 90 µm to about 300 µm, from about 100 µm to about 300 µm, from about 110 µm to about 300 µm, from about 120 µm to about 300 µm, from about 140 µm to about 300 µm, from about 150 µm to about 300 µm, from about 40 µm to about 290 µm, from about 40 µm to about 280 µm, from about 40 µm to about 260 µm, from about 40 µm to about 250 µm, from about 40 µm to about 240 µm, from about 40 µm to about 230 µm, from about 40 µm to about 220 µm, from about 40 µm to about 210 µm, from about 40 µm to about 200 µm, from about 40 µm to about 180 µm, from about 40 µm to about 160 µm, from about 40 µm to about 150 µm, from about 40 µm to about 140 µm, from about 40 µm to about 130 µm, from about 40 µm to about 120 µm, from about 40 µm to about 110 µm, or from about 40 µm to about 100 µm.

In one or more embodiments, the glass articles used to form the layer(s) of the deadfront structures may have a CS (which may be found at the surface or a depth within the glass article) of about 200 MPa or greater, 300 MPa or greater, 400 MPa or greater, about 500 MPa or greater, about 600 MPa or greater, about 700 MPa or greater, about 800 MPa or greater, about 900 MPa or greater, about 930 MPa or greater, about 1000 MPa or greater, or about 1050 MPa or greater.

In one or more embodiments, the glass articles used to form the layer(s) of the deadfront structures may have a maximum tensile stress or central tension (CT) of about 20 MPa or greater, about 30 MPa or greater, about 40 MPa or greater, about 45 MPa or greater, about 50 MPa or greater, about 60 MPa or greater, about 70 MPa or greater, about 75 MPa or greater, about 80 MPa or greater, or about 85 MPa or greater. In some embodiments, the maximum tensile stress or central tension (CT) may be in a range from about 40 MPa to about 100 MPa.

Aspect (1) of this disclosure pertains to a deadfront configured to hide a display when the display is not active, the deadfront comprising: a substrate having a first major surface and a second major surface, the second major surface being opposite the first major surface; a neutral density filter disposed on the second major surface of the transparent substrate; and an ink layer disposed on the neutral density filter; wherein the ink layer defines at least one display region in which the deadfront transmits at least 60% of incident light and at least one non-display region in which the deadfront transmits at most 5% of incident light; wherein a contrast sensitivity between each of the at least one display region and each of the at least one non-display region is at least 15 when the display is not active.

Aspect (2) pertains to the article of Aspect (1), wherein the substrate transmits at least 70% of incident light in the visible spectrum.

Aspect (3) pertains to the article of Aspect (1) or Aspect (2), wherein the substrate is a plastic that is at least one of polymethylmethacrylate, polyethylene terephthalate, cellulose triacetate, or polycarbonate.

Aspect (4) pertains to the article of Aspect (1) or Aspect (2), wherein the substrate is a glass or glass-ceramic material.

Aspect (5) pertains to the article of Aspect (1) or Aspect (2), wherein the substrate comprises at least one of soda lime glass, aluminosilicate glass, borosilicate glass, boroaluminosilicate glass, alkali-containing aluminosilicate glass, alkali-containing borosilicate glass, or alkali-containing boroaluminosilicate glass.

Aspect (6) pertains to the article of any one of Aspects (1) through (5), wherein the neutral density filter transmits up to 80% of light in the visible spectrum.

Aspect (7) pertains to the article of any one of Aspects (1) through (6), wherein the neutral density filter transmits at least 60% of light in the visible spectrum.

Aspect (8) pertains to the article of any one of Aspects (1) through (7), wherein the neutral density filter comprises a film.

Aspect (9) pertains to the article of Aspect (8), wherein the film comprises one or more polyester layers and at least one layer comprising at least one of a dye, a pigment, a metallized layer, ceramic particles, carbon particles, or nanoparticles.

Aspect (10) pertains to the article of any one of Aspects (1) through (7), wherein the neutral density filter comprises an ink coating.

Aspect (11) pertains to the article of Aspect (10), wherein the ink coating is a CYMK neutral black.

Aspect (12) pertains to the article of Aspect (10) or (11), wherein the ink coating has an L* of from 50 to 90 according to the CIE L*a*b* color space.

Aspect (13) pertains to the article of any one of Aspects (1) through (12), wherein neutral density filter is a solid color.

Aspect (14) pertains to the article of any one of Aspects (1) through (13), wherein the ink layer has an ink reflection coefficient of from 0.1% to 5%.

Aspect (15) pertains to the article of any one of Aspects (1) through (14), further comprising a surface treatment disposed on the first major surface of the substrate.

Aspect (16) pertains to the article of Aspect (15), wherein the surface treatment is at least one of antiglare, etching, antireflection coating, or durable antireflection coating.

Aspect (17) pertains to the article of any one of Aspects (1) through (16), wherein the substrate is 1 mm or less in thickness.

Aspect (18) of this disclosure pertains to a device, comprising: a deadfront having a first side and a second side, the second side being opposite the first side, the deadfront comprising: a substrate having a first major surface and a second major surface, the first surface corresponding to the first side of the deadfront and the second major surface being opposite the first major surface; a neutral density filter disposed on at least a portion of the second major surface of the transparent substrate; and an ink layer disposed on at least a portion of the neutral density filter; and a light source disposed on the second side of the deadfront; wherein light having a first intensity is emitted from the light source onto the second side of the deadfront and light transmitted through a display region of the deadfront has a second intensity, the second intensity being within 30% of the first intensity.

Aspect (19) pertains to the device of Aspect (18), wherein the neutral density filter transmits at least 70% of light in the visible spectrum.

Aspect (20) pertains to the device of Aspect (18) or (19), wherein the ink layer comprises an ink having a reflection coefficient of less than 5%.

Aspect (21) pertains to the device of any one of Aspects (18) through (20), wherein the light source is at least one of a light emitting diode (LED) display, an organic LED (OLED) display, a liquid crystal display (LCD), or a plasma display.

Aspect (22) pertains to the device of any one of Aspects (18) through (21), wherein the neutral density filter transmits up to 80% of light in the visible spectrum.

Aspect (23) pertains to the device of any one of Aspects (18) through (22), wherein the light source has an internal reflection coefficient of less than 5%.

Aspect (24) pertains to the device of any one of Aspects (18) through (23), wherein the display region of the deadfront is defined by the absence of the ink layer.

Aspect (25) pertains to the device of any one of Aspects (18) through (24), wherein the portion of the deadfront comprising the ink layer defines a non-display region and wherein the contrast sensitivity between the display region and the non-display region is at least 15.

Aspect (26) pertains to the device of any one of Aspects (18) through (25), wherein the ink layer comprises an ink having a reflection coefficient of less than 5%.

Aspect (27) pertains to the device of any one of Aspects (18) through (26), wherein the neutral density filter comprises a film.

Aspect (28) pertains to the device of Aspect (27), wherein the film comprises one or more polyester layers and at least one layer comprising at least one of a dye, a pigment, a metallized layer, ceramic particles, carbon particles, or nanoparticles.

Aspect (29) pertains to the device of any one of Aspects (18) through (26), wherein the neutral density filter comprises an ink coating.

Aspect (30) pertains to the device of Aspect (29), wherein the ink coating is a CYMK neutral black.

Aspect (31) pertains to the device of Aspect (29) or (30), wherein the ink coating has an L* of from 50 to 90 according to the CIE L*a*b* color space.

Aspect (32) pertains to the device of any one of Aspects (18) through (31), wherein the deadfront further comprises a surface treatment on the first major surface of the substrate, the surface treatment comprising at least one of antiglare, etching, antireflection coating, or durable antireflection coating.

Aspect (33) pertains to the device of any one of Aspects (18) through (32), wherein the substrate is 1 mm or less in thickness.

Aspect (34) of this disclosure pertain to an article comprising: a deadfront having a first side and a second side, the second side being opposite the first side, the deadfront comprising: a substrate having a first major surface and a second major surface, the first surface corresponding to the first side of the deadfront and the second major surface being opposite the first major surface; a neutral density filter disposed on the second major surface of the transparent substrate; and an ink layer disposed on the neutral density filter, wherein the ink layer comprises an ink having a reflection coefficient of less than 5%; and a display disposed on the second side of the deadfront, the display having an internal reflectance of less than 5%; wherein the ink layer defines a non-display region through which light from the display is not transmitted and absence of the ink layer defines a display region through which at light from the display is transmitted.

Aspect (35) pertains to the article of Aspect (34), wherein a contrast sensitivity between the non-display region and the display region is at least 15.

Aspect (36) pertains to the article of Aspect (34) or (35), wherein the neutral density filter transmits up to 80% of light in the visible spectrum.

Aspect (37) pertains to the article of any one of Aspects (34) through (36), wherein the neutral density filter transmits at least 60% of light in the visible spectrum.

Aspect (38) pertains to the article of any one of Aspects (34) through (37), wherein the neutral density filter comprises a film.

Aspect (39) pertains to the article of Aspect (38), wherein the film comprises one or more polyester layers and at least one layer comprising at least one of a dye, a pigment, a metallized layer, ceramic particles, carbon particles, or nanoparticles.

Aspect (40) pertains to the article of any one of Aspects (34) through (37), wherein the neutral density filter comprises an ink coating.

Aspect (41) pertains to the article of Aspect (40), wherein the ink coating is a CYMK neutral black.

Aspect (42) pertains to the article of Aspect (40) or (41), wherein the ink coating has an L* of from 50 to 90 according to the CIE L*a*b* color space.

Aspect (43) pertains to the article of any one of Aspects (34) through (42), wherein the display is at least one of a light emitting diode (LED) display, an organic LED (OLED) display, a liquid crystal display (LCD), or a plasma display.

Aspect (44) pertains to the article of any one of Aspects (34) through (43), further comprising a surface treatment disposed on the first major surface of the substrate.

Aspect (45) pertains to the article of Aspect (44), wherein the surface treatment is at least one of antiglare, etching, antireflection coating, or durable antireflection coating.

Aspect (46) pertains to the article of any one of Aspects (34) through (45), wherein the substrate is 1 mm or less in thickness.

Aspect (47) of this disclosure pertains to a vehicle, comprising: an interior surface; a display disposed on the interior surface, the display having an internal reflectance of less than 5%; a deadfront having a first side and a second side, the second side being opposite the first side and disposed on the display, the deadfront comprising: a substrate having a first major surface and a second major surface, the first surface corresponding to the first side of the deadfront and the second major surface being opposite the first major surface; a neutral density filter disposed on the second major surface of the transparent substrate; and an ink layer disposed on the neutral density filter, wherein the ink layer comprises an ink having a reflection coefficient of less than 5%; and wherein the ink layer defines a non-display region through which light from the display is not transmitted and absence of the ink layer defines a display region through which at light from the display is transmitted.

Aspect (48) pertains to the vehicle of Aspect (47), wherein a contrast sensitivity between the non-display region and the display region is at least 15.

Aspect (49) pertains to the vehicle of Aspect (47) or (48), wherein the neutral density filter transmits up to 80% of light in the visible spectrum.

Aspect (50) pertains to the vehicle of any one of Aspects (47) through (49), wherein the neutral density filter transmits at least 60% of light in the visible spectrum.

Aspect (51) pertains to the vehicle of any one of Aspects (47) through (50), wherein the neutral density filter comprises a film.

Aspect (52) pertains to the vehicle of Aspect (51), wherein the film comprises one or more polyester layers and at least one layer comprising at least one of a dye, a pigment, a metallized layer, ceramic particles, carbon particles, or nanoparticles.

Aspect (53) pertains to the vehicle of any one of Aspects (47) through (49), wherein the neutral density filter comprises an ink coating.

Aspect (54) pertains to the vehicle of Aspect (53), wherein the ink coating is a CYMK neutral black.

Aspect (55) pertains to the vehicle of Aspect (53) or (54), wherein the ink coating has an L* of from 50 to 90 according to the CIE L*a*b* color space.

Aspect (56) pertains to the vehicle of any one of Aspects (47) through (55), wherein the display is at least one of a light emitting diode (LED) display, an organic LED (OLED) display, a liquid crystal display (LCD), or a plasma display.

Aspect (57) pertains to the vehicle of any one of Aspects (47) through (56), further comprising a surface treatment disposed on the first major surface of the substrate.

Aspect (58) pertains to the vehicle of Aspect (57), wherein the surface treatment is at least one of anti-glare coating, an anti-glare surface, an antireflection coating, an antireflection surface, an easy-to-clean coating or an ink decoration.

Aspect (59) pertains to the vehicle of any one of Aspects (47) through (58), wherein the substrate is 1 mm or less in thickness.

Aspect (60) pertains to the vehicle of any one of Aspects (47) through (59), wherein the interior surface comprises any one of a dashboard, a seat back, an arm rest, a pillar, door panel, floor board, headrest, steering wheel, or a visor.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A deadfront configured to hide a display when the display is not active, the deadfront comprising:
    a substrate having a first major surface and a second major surface, the second major surface being opposite the first major surface;
    a neutral density filter disposed on the second major surface of the substrate; and
    an ink layer disposed on the neutral density filter;
       wherein the ink layer defines at least one display region in which the deadfront transmits at least 60% of incident light and at least one non-display region in which the deadfront transmits at most 5% of incident light;
       wherein the ink layer reflects light incident on an interface between the ink layer and the neutral density filter through the first major surface such that a contrast sensitivity between each of the at least one display region and each of the at least one non-display region is at least 15 when the display is not active,
       wherein the contrast sensitivity is calculated according to following formula:

$$CS \approx R_N + R_I / |R_D - R_I|$$

where $R_N$ is a reflectance off the first major surface of the substrate, $R_I$ is a reflectance of the ink layer back through the first major surface, and $R_D$ is an internal reflectance of the display when the display is underlying the at least one display region,
    wherein $R_I$ is between 0.1% to 5%.

2. The deadfront article of claim 1, wherein the substrate transmits at least 70% of incident light in the visible spectrum.

3. The deadfront article of claim 1, wherein the substrate is a plastic that is at least one of polymethylmethacrylate, polyethylene terephthalate, cellulose triacetate or polycarbonate.

4. The deadfront article of claim 1, wherein the substrate is a glass or glass-ceramic material.

5. The deadfront article of claim 1, wherein the substrate comprises at least one of soda lime glass, aluminosilicate glass, borosilicate glass, boroaluminosilicate glass, alkali-containing aluminosilicate glass, alkali-containing borosilicate glass, or alkali-containing boroaluminosilicate glass.

6. The deadfront article of claim 1, wherein the neutral density filter transmits up to 80% of light in the visible spectrum.

7. The deadfront article of claim 1, wherein the neutral density filter transmits at least 60% of light in the visible spectrum.

8. The deadfront article of claim 1, wherein the neutral density filter comprises a film.

9. The deadfront article of claim 8, wherein the film comprises one or more polyester layers and at least one layer comprising at least one of a dye, a pigment, a metallized layer, ceramic particles, carbon particles, or nanoparticles.

10. The deadfront article of claim 1, wherein the neutral density filter comprises an ink coating.

11. The deadfront article of claim 10, wherein the ink coating is a CYMK neutral black.

12. The deadfront article of claim 10, wherein the ink coating has an L* of from 50 to 90 according to the CIE L*a*b* color space.

13. The deadfront article of claim 1, wherein neutral density filter is a solid color.

14. The deadfront article of claim 1, wherein the ink layer has an ink reflection coefficient of from 0.1% to 5%.

15. The deadfront article of claim 1, further comprising a surface treatment disposed on the first major surface of the substrate.

16. The deadfront article of claim 15, wherein the surface treatment is at least one of antiglare, etching, antireflection coating, or durable antireflection coating.

17. The deadfront article of claim 1, wherein the substrate is 1 mm or less in thickness.

18. A device, comprising:
    a deadfront having a first side and a second side, the second side being opposite the first side, the deadfront comprising:
        a substrate having a first major surface and a second major surface, the first surface corresponding to the first side of the deadfront and the second major surface being opposite the first major surface;
        a neutral density filter disposed on at least a portion of the second major surface of the substrate; and
        an ink layer disposed on at least a portion of the neutral density filter; and
    a light source disposed on the second side of the deadfront;
    wherein light having a first intensity is emitted from the light source onto the second side of the deadfront and light transmitted through a display region of the deadfront has a second intensity, the second intensity being within 30% of the first intensity,
    wherein the ink layer comprises a reflection coefficient from 1% to 4% at an interface between the neutral density filter and the ink layer such that the ink layer reflects light incident on the interface through the first major surface.

19. A vehicle, comprising:
an interior surface;
a display disposed on the interior surface, the display having an internal reflectance of less than 5%;
a deadfront having a first side and a second side, the second side being opposite the first side and disposed on the display, the deadfront comprising:
  a substrate having a first major surface and a second major surface, the first surface corresponding to the first side of the deadfront and the second major surface being opposite the first major surface;
  a neutral density filter disposed on the second major surface of the substrate; and
  an ink layer disposed on the neutral density filter, wherein the ink layer comprises an ink having a reflection coefficient of greater than or equal to 1% and less than or equal to 4% at an interface between the neutral density filter and the ink layer such that the ink layer reflects light incident on the interface through the first major surface; and
wherein the ink layer defines a non-display region through which light from the display is not transmitted and absence of the ink layer defines a display region through which at light from the display is transmitted.

* * * * *